(12) United States Patent
Soborski

(10) Patent No.: US 9,519,942 B2
(45) Date of Patent: Dec. 13, 2016

(54) METHODS AND A COMPUTING DEVICE FOR DETERMINING WHETHER A MARK IS GENUINE

(71) Applicant: SYS-TECH SOLUTIONS, INC., Cranbury, NJ (US)

(72) Inventor: Michael L. Soborski, Allentown, NJ (US)

(73) Assignee: SYS-TECH SOLUTIONS, INC., Princeton, NJ (US)

(*) Notice: Subject to any disclaimer, the term of this patent is extended or adjusted under 35 U.S.C. 154(b) by 0 days.

(21) Appl. No.: 14/623,925

(22) Filed: Feb. 17, 2015

(65) Prior Publication Data

US 2016/0239934 A1 Aug. 18, 2016

(51) Int. Cl.
*G06K 9/00* (2006.01)
*G06T 1/00* (2006.01)

(52) U.S. Cl.
CPC ..... *G06T 1/0042* (2013.01); *G06T 2201/0063* (2013.01)

(58) Field of Classification Search
CPC ............... G06T 1/0042; G06T 2201/0063
See application file for complete search history.

(56) References Cited

U.S. PATENT DOCUMENTS

| | | | | |
|---|---|---|---|---|
| 7,013,024 B2* | 3/2006 | Cordery | ............... | G06K 7/1417 235/462.09 |
| 7,107,453 B2* | 9/2006 | Yen | ............... | G06K 1/121 380/54 |
| 7,162,035 B1 | 1/2007 | Durst et al. | | |
| 7,878,398 B2* | 2/2011 | Chen | ............... | G06K 19/08 235/454 |
| 8,408,470 B2* | 4/2013 | Komatsu | ............... | G06K 19/14 156/220 |
| 8,488,834 B2* | 7/2013 | Honsinger | ............... | G06T 1/0028 382/100 |
| 2004/0052400 A1 | 3/2004 | Inomata et al. | | |
| 2008/0226297 A1* | 9/2008 | Sinclair | ............... | G06K 19/086 398/139 |
| 2009/0169019 A1 | 7/2009 | Bauchot et al. | | |
| 2011/0121066 A1* | 5/2011 | Tian | ............... | G06K 19/14 235/375 |
| 2011/0145889 A1 | 6/2011 | Tomkow | | |
| 2012/0242452 A1 | 9/2012 | Bauchot et al. | | |

OTHER PUBLICATIONS

International Search Report and Written Opinion issued in corresponding application PCT/US2015/058620, Feb. 17, 2016, 10 pages.

* cited by examiner

*Primary Examiner* — Soo Park
(74) *Attorney, Agent, or Firm* — Drinker Biddle & Reath LLP

(57) ABSTRACT

The present disclosure is generally directed to a method and computing device for determining whether a mark is genuine. According to various embodiments, a computing device (or logic circuitry thereof) uses unintentionally-produced artifacts within a genuine mark to define an identifiable electronic signature, and extracts certain location identifiers corresponding to certain measured features of the signature in order to enhance the ease and speed with which numerous genuine signatures can be searched and compared with signatures of candidate marks.

10 Claims, 18 Drawing Sheets

METHODS AND A COMPUTING DEVICE FOR DETERMINING WHETHER A MARK IS GENUINE

TECHNICAL FIELD

The present disclosure is related generally to anti-counterfeiting technology and, more particularly, to methods and a computing device for determining whether a mark is genuine.

BACKGROUND

Counterfeit products are, unfortunately, widely available and often hard to spot. When counterfeiters produce fake goods, they typically copy the labeling and bar codes in addition to the actual products. At a superficial level, the labels and bar codes may appear genuine and even yield valid data when scanned (e.g., decode to the appropriate Universal Product Code). While there are many technologies currently available to counter such copying, most of these solutions involve the insertion of various types of codes, patterns, microfibers, microdots, and other indicia to help thwart counterfeiting. Such techniques require manufacturers to use additional equipment and material and add a layer of complexity to the production process.

DRAWINGS

While the appended claims set forth the features of the present techniques with particularity, these techniques, together with their objects and advantages, may be best understood from the following detailed description taken in conjunction with the accompanying drawings of which:

FIG. 1 is an example of a system in which various embodiments of the disclosure may be implemented;

FIG. 2A, FIG. 2B, and FIG. 2C are flow charts of processes carried by one or more computing devices according to an embodiment;

FIG. 3 is another example of a system in which various embodiments of the disclosure may be implemented;

FIG. 4A, FIG. 4B, and FIG. 4C are flow charts of processes carried by one or more computing devices according to an embodiment;

Figure 14:
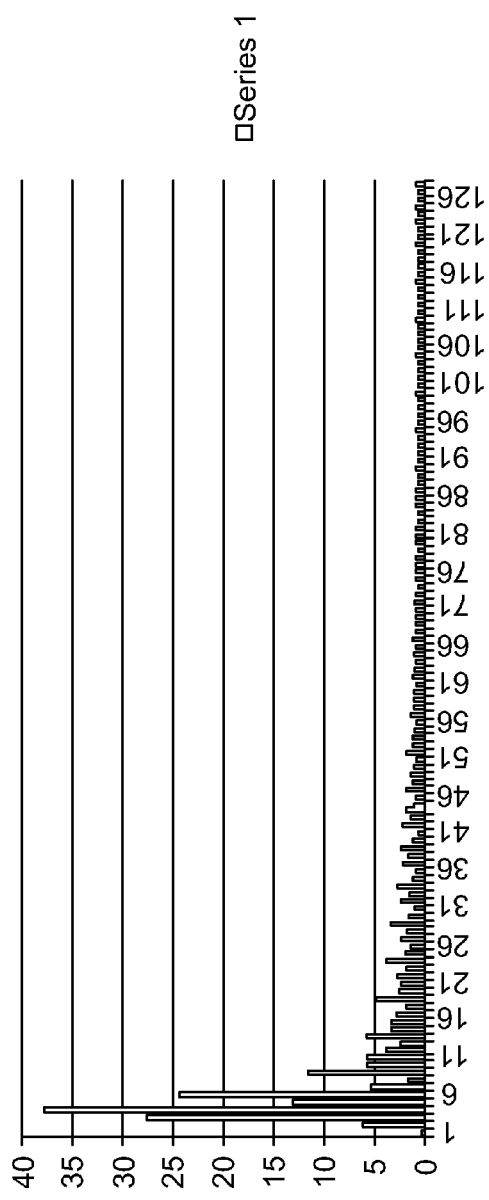
Figure 15:
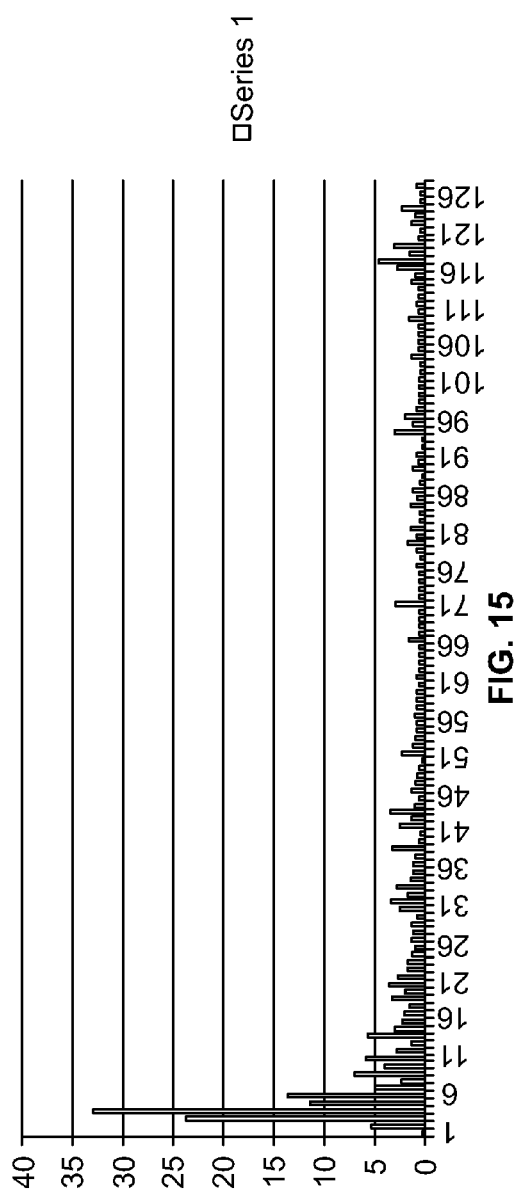
Figure 16:
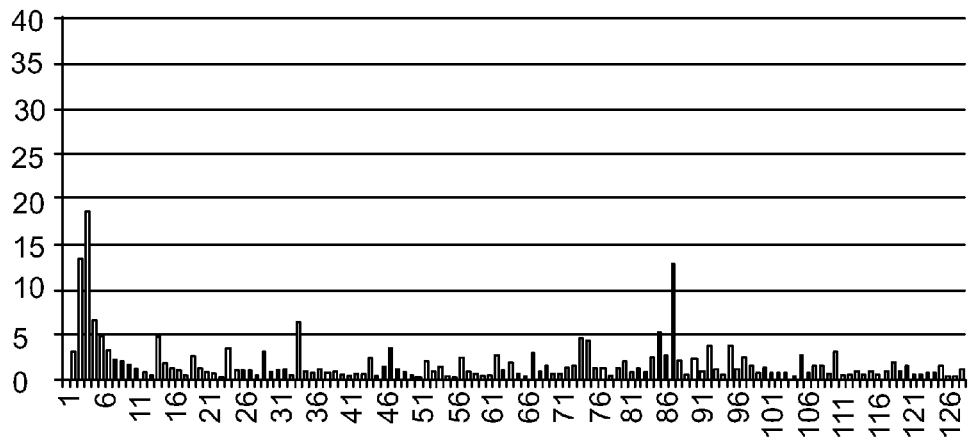
Figure 17:
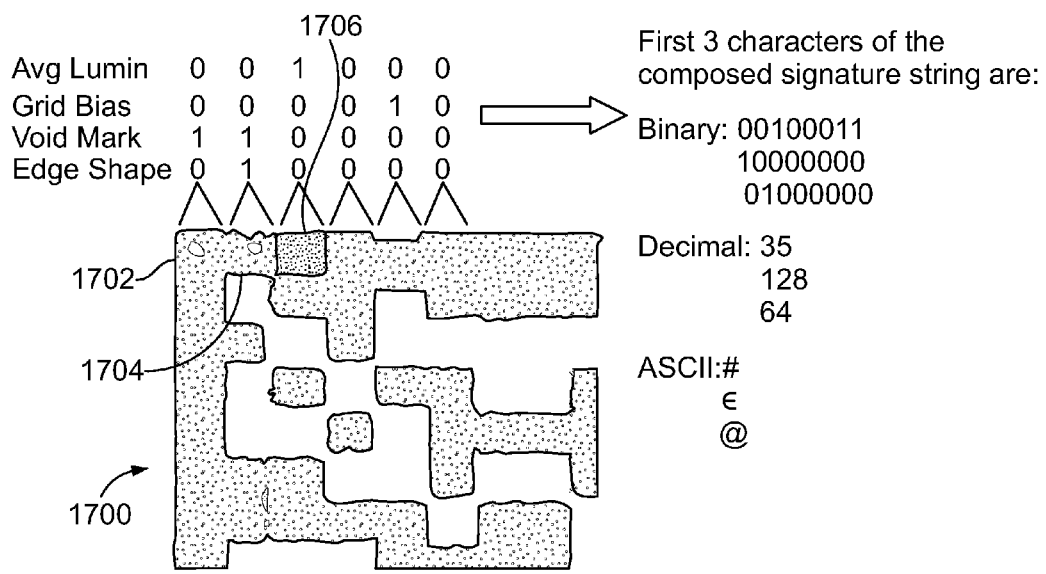

FIG. 14, FIG. 15, and FIG. 16 show examples of power series generated by a computing device in an embodiment; and FIG. 17 shows a example of how a computing device generates an electronic signature for a mark in an embodiment.

DESCRIPTION

The present disclosure is generally directed to methods and a computing device for determining whether a mark is genuine. According to various embodiments, a computing device (or logic circuitry thereof) uses unintentionally-produced artifacts within a genuine mark to define an identifiable electronic signature ("signature"), and extracts certain features of the signature in order to enhance the ease and speed with which numerous genuine signatures can be searched and compared with signatures of candidate marks.

This disclosure will often refer to a "mark." As used herein, a "mark" is a visible indicator that is intentionally put on a physical object. A mark may be something that identifies a brand (e.g., a logo), something that bears information, such as a barcode (e.g., a two-dimensional ("2D") barcode as specified in the International Organization for Standardization ("ISO") and the International Electrotechnical Commission ("IEC") standard ISO/IEC 16022), an expiration date, or tracking information such as a serial number), or a decoration. A mark is visible in some portion of the electromagnetic spectrum, though not necessarily with the naked eye.

The term "artifact" as used herein is a feature of a mark that was produced by the machine or process that created the mark, but not by design or intention (i.e., an irregularity). Examples of artifacts include: (a) deviation in average color of a subarea (e.g., a cell of a 2D barcode) from an average derived from within the mark (which may be an average for neighboring cells of the same nominal color), (b) bias in the position of a subarea relative to a best-fit grid of neighboring subareas, (c) areas of a different one of at least two colors from a nominal color of the cells, (d) deviation from a nominal shape of a continuous edge within the mark, and (e) imperfections or other variations resulting from the mark being printed. In some embodiments, an artifact is not controllably reproducible.

The terms "closely match," "closely matching," and "closely matched" as used herein refer the results of a determination made based on a comparison between values (e.g., two hash identifiers) that yields a similarity between the values that reaches or exceeds a predetermined threshold. For example, if the predetermined threshold is 20 percent, then two hash identifiers may be said to "closely match," be "closely matching," or are "closely matched" if 20 percent or more of the constituent parts (e.g., 20 percent or more of the constituent hash identifier blocks) of one hash identifier are equal in value to 20 percent or more of the constituent parts of the other hash identifier.

The term "location identifier" as used herein refers to a numerical value that maps to a location in a mark. The mapping relationship between a location identifier and the location within the mark may be one-to-one. An example of a location identifier having a one-to-one mapping relationship with a location in a mark is a raster index number.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a computing device carrying out an action, it is to be understood that this can also mean that logic circuitry integrated with the computing device is, in fact, carrying out the action.

The term "mobile communication device" as used herein is a communication device that is capable of sending and receiving information over a wireless network such as a cellular network or a WiFi network. Examples of mobile communication devices include cell phones (e.g., smartphones), tablet computers, and portable scanners having wireless communication functionality.

This disclosure is generally directed to methods and a computing device for determining whether a mark is genuine. According to an embodiment, a computing device receives a captured image of a candidate mark, measures a characteristic of the candidate mark in multiple locations of the candidate mark using the captured image, resulting in a set of metrics (in some cases, multiple sets of metrics) for that characteristic. The computing device generates a signature for the candidate mark based on the set of metrics. The computing device derives a hash identifier ("HID") using location identifiers corresponding to a subset of the locations at which it measured the characteristic (e.g., raster index numbers of the locations that yielded the highest-magnitude measurements). The computing device determines, based on a comparison of the HID of the candidate mark to a previously-derived and stored HID of a genuine mark, whether the respective HIDs closely match one another. If the computing device determines that the HID of the candidate mark closely matches (according to a predetermined threshold) the HID of the genuine mark, then the computing device retrieves the signature of the genuine mark from a media storage device (wherein the signature of the genuine mark contains data regarding an artifact of the genuine mark) and compares the signature of the candidate mark with the retrieved signature of the genuine mark.

In another embodiment, a computing device (or logic circuitry thereof) receives a captured image of a genuine mark, measures a characteristic of the candidate mark using the captured image, resulting in a set of metrics (in some cases, multiple sets of metrics) for that characteristic. The computing device generates a signature for the genuine mark based on the set of metrics. The computing device derives an HID from the signature using location identifiers corresponding to a subset of the locations at which it measured the characteristic (e.g., raster index numbers of the locations that yielded the highest-magnitude measurements) and stores the HID in a media storage device in association with the signature. In one embodiment, the computing device stores the HID and signature in a database in such a way that the computing device can subsequently query the database using the HID (or using an unknown HID that may closely match the HID of the signature of the genuine mark).

According to various embodiments, an HID of a candidate mark may closely match the HIDs of multiple genuine marks. Comparing the HID of a candidate mark with HIDs of genuine marks is, however, less computationally intensive and uses less memory than comparing actual signatures. Thus, by using HIDs in an initial pass through a set of known signatures of genuine marks, a computing device or logic circuitry can significantly cut down on the number of actual signatures that need to be compared.

Figure 1:
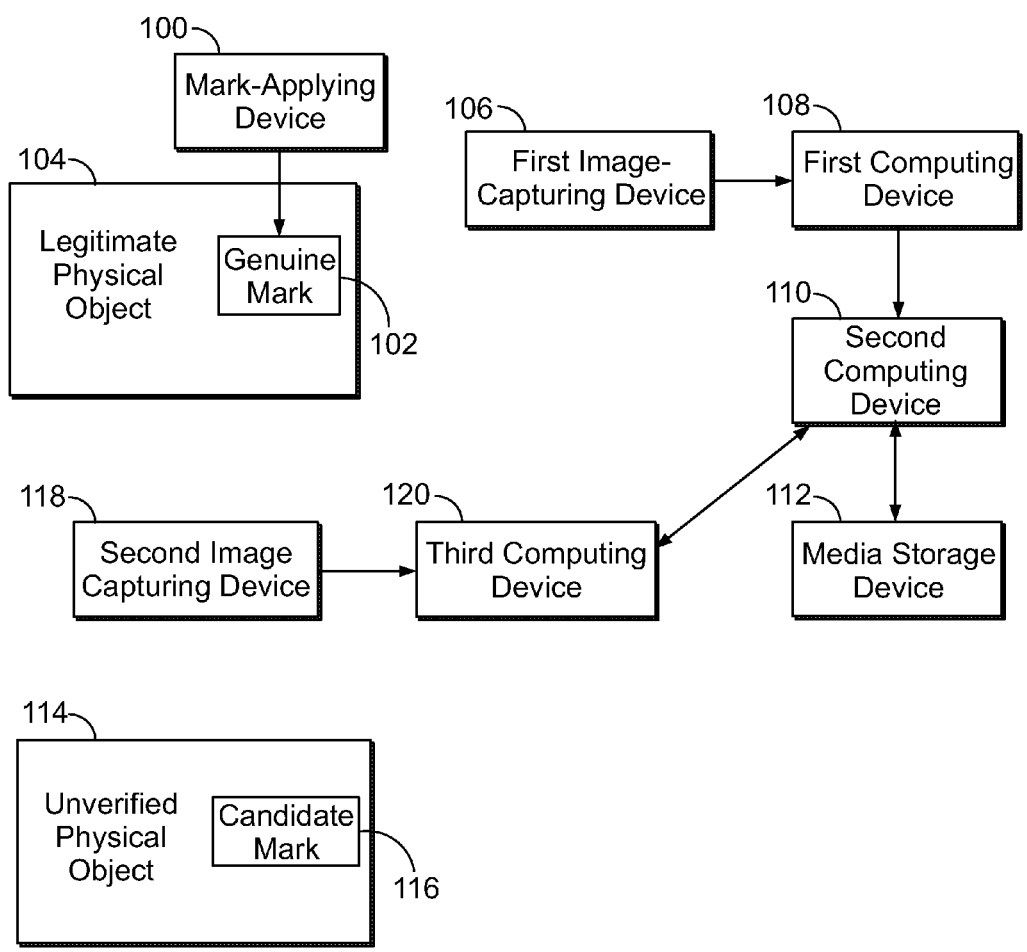

Turning to FIG. 1, an example of a system in which various embodiments of the disclosure may be implemented is shown. The procedures carried out within this system are shown in the flow charts of FIG. 2A, FIG. 2B, and FIG. 2C. FIG. 1 is described here in parallel with FIG. 2A, FIG. 2B, and FIG. 2C.

Figure 2A:
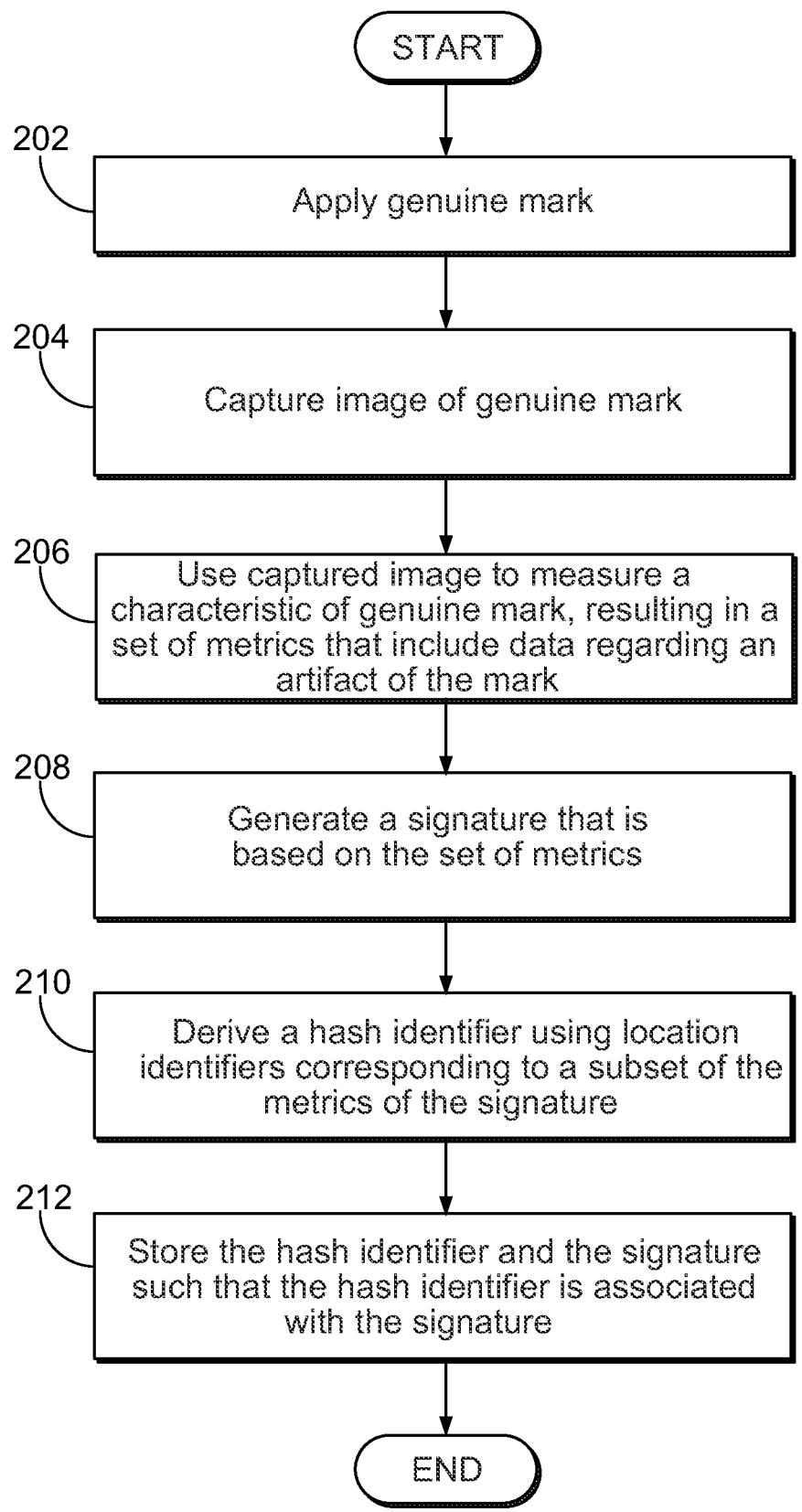
Figure 2B:
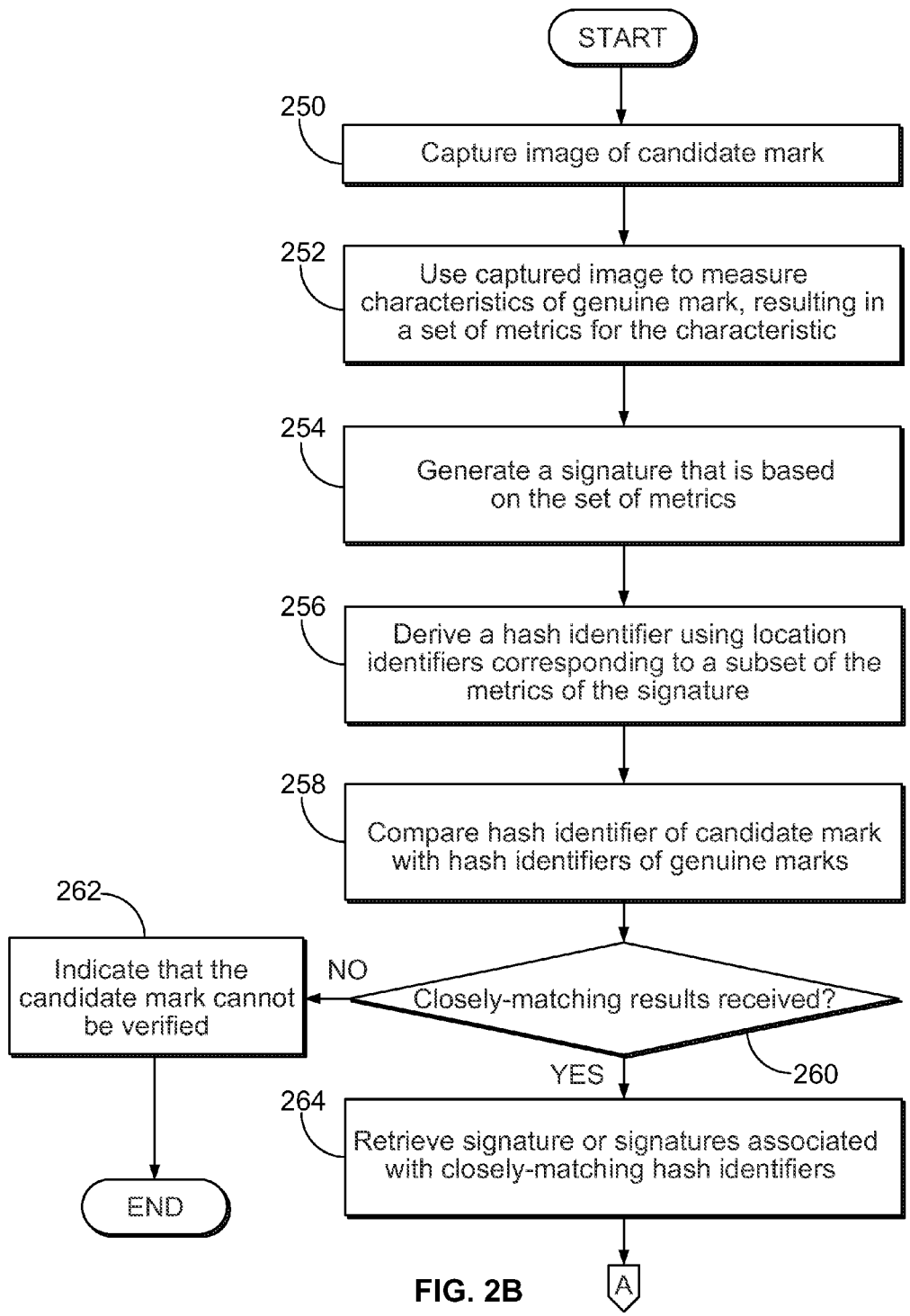

A mark-applying device 100 applies a genuine mark 102 ("mark 102") to a legitimate physical object 104 ("object 104") (block 202 of FIG. 2A). In some embodiments, the object 104 is an article of manufacture, such as a piece of clothing, handbag, or fashion accessory. In other embodiments, the object 104 is a label, such as a barcode label or packaging for some other physical object. The mark 102 may be something that identifies a brand (e.g., a logo), something that bears information (e.g., a barcode), or a decoration. Possible embodiments of the mark-applying device 100 include a printer (e.g., a laser or thermal printer), an etching device, an engraving device, a mold-applying device, a branding device, a stitching device, and a thermal-transfer device. The mark-applying device 100 applies the mark 102 by, for example, printing, etching, engraving, molding, branding, stitching, or thermally transferring the mark 102 onto the object 104. The mark 102 includes one or more artifacts. In some embodiments, the mark 102 also includes intentionally-produced anti-counterfeiting features, such as microscopic patterns.

A first image-capturing device 106 (e.g., a camera, machine-vision device, or scanner) captures an image of the mark 102 after the mark 102 is applied (block 204). The circumstances under which the first image-capturing device 106 captures the image of the mark 102 are controlled, such that there is reasonable assurance that the image is, in fact, that of a genuine mark 102. For example, the time interval between the mark-applying device 100 applying the mark 102 and the first image-capturing device 106 obtaining the image of the mark 102 may be small, and the first image-capturing device 106 may be physically located next to the mark-applying device 100 along a packaging line. Thus, when the term "genuine mark" is used, it refers to a mark that was applied by a mark-applying device at a legitimate source (i.e., not copied illegally or surreptitiously).

The first image-capturing device 106 transmits the captured image to a first computing device 108. Possible embodiments of the first computing device 108 include a desktop computer, a rack-mounted server, a laptop computer, a tablet computer, and a mobile phone. In some embodiments, the first image-capturing device 106 is integrated with the first computing device 108, in which case the first image-capturing device 106 transmits the captured image to logic circuitry of the first computing device 108. The first computing device 108 or logic circuitry therein receives the captured image and transmits the captured image to a second computing device 110. Possible implementations of the second computing device 110 include all of those devices listed for the first computing device 108.

The second computing device 110 receives the captured image and uses the captured image to measure various characteristics of the mark 102, resulting in a set of metrics that include data regarding artifacts of the mark 102 (block 206). As will be described further, the set of metrics may be one of several sets of metrics that the second computing device 110 generates about the mark 102. The second computing device 110 may carry out the measurements in different locations on the mark 102. In doing so, the second computing device 110 can divide the mark 102 into multiple subareas (e.g., in accordance with an industry standard). In an embodiment, if the mark 102 is a 2D barcode, the second computing device 110 carries out measurements on all of or a subset of the total number of subareas (e.g., all of or a subset of the total number of cells) of the mark 102. Examples of characteristics of the mark 102 that the second computing device 110 may measure include: (a) feature shape, (b) feature aspect ratios, (c) feature locations, (d) feature size, (e) feature contrast, (f) edge linearity, (g) region discontinuities, (h) extraneous marks, (i) printing defects, (j) color (e.g., lightness, hue, or both), (k) pigmentation, and (l) contrast variations. In some embodiments, the second computing device 110 takes measurements on the same locations from mark to mark for each characteristic, but on different locations for different characteristics. For example, the first second computing device 110 might measure the average pigmentation on a first set of locations of a mark, and on that same first set of locations for subsequent marks, but measure edge linearity on a second set of locations on the mark and on subsequent marks. The two sets of locations (for the different characteristics) may be said to be "different" if there is at least one location that is not common to both sets.

In an embodiment, the results of characteristic measuring by the second computing device 110 include a set of metrics. There may be one or more sets of metrics for each of the measured characteristics. The second computing device 110 analyzes the set of metrics and, based on the analysis, generates a signature that is based on the set of metrics (block 208). Because the set of metrics includes data regarding an artifact (or multiple artifacts) of the mark 102, the signature will be indirectly based on the artifact. If the mark 102 carries data (as in the case of a 2D barcode), the second computing device 110 may also include such data as part of the signature. Put another way, in some embodiments, the signature may be based on both artifacts of the mark 102 and on the data carried by the mark 102.

In an embodiment, in order to generate the signature, for each measured characteristic of the mark 102, the second computing device 110 ranks the metrics associated with the characteristic by magnitude and use only those metrics that reach a predetermined threshold as part of the signature. For example, the second computing device 110 might refrain from ranking those metrics that are below the predetermined threshold. In an embodiment, there is a different predetermined threshold for each characteristic being measured. One or more of the predetermined thresholds may be based on a noise threshold and on the resolution of the first image-capturing device 106.

In an embodiment, the second computing device 110 obtains one hundred data points for each characteristic and collects six groups of measurements: one set of measurements for pigmentation, one set of measurements for deviation from a best-fit grid, one set of measurements for extraneous markings or voids, and three separate sets of measurements for edge linearity.

As part of the ranking process, the second computing device 110 may group together metrics that are below the predetermined threshold regardless of their respective locations (i.e., regardless of their locations on the mark 102). Also, the second computing device 110 may order the metrics (e.g., by magnitude) in each characteristic category as part of the ranking process. Similarly, the second computing device 110 might simply discount the metrics that are below the predetermined threshold. Also, the process of ranking may simply constitute separating metrics that are above the threshold from those that are below the threshold.

In an embodiment, the second computing device 110 orders the measured characteristics according to how sensitive the characteristics are to image resolution issues. For example, if the first image-capturing device 106 does not have the capability to capture an image in high resolution, it might be difficult for the second computing device 110 to identify non-linearities of edges. However, the second computing device 110 may have no problem identifying deviations in pigmentation. Thus, the second computing device 110 might, on this basis, prioritize pigmentation over edge non-linearities. According to an embodiment, the second computing device 110 orders the measured characteristics in reverse order of resolution-dependence as follows: subarea pigmentation, subarea position bias, locations of voids or extraneous markings, and edge non-linearities.

According to an embodiment, the second computing device 110 weights the measured characteristics of the mark 102 based on one or more of the resolution of the first image-capturing device 106 and the resolution of the captured image of the mark 102. For example, if the resolution of the first image-capturing device 106 is low, then the second computing device 110 may give more weight to the average pigmentation of the various subareas of the mark 102. If the resolution of first image-capturing device 106 is high, then the second computing device 110 may give measurements of the edge irregularities of various subareas higher weight than other characteristics.

If the mark 102 includes error-correcting information, such as that set forth by ISO/IEC 16022, then the second computing device 110 may use the error-correcting information to weight the measured characteristics. For example, the second computing device 110 could read the error-correcting information, use the error-correcting information to determine which subareas of the mark 102 have errors, and under-weight the measured characteristics of such subareas.

According to an embodiment, in generating the signature, the second computing device 110 weights the measurements for one or more of the characteristics of the mark 102 based on the mark-applying device 100. For example, assume that the mark-applying device 100 is a thermal transfer printer. Further assume that it is known that, for those marks applied by the mark-applying device 100, edge projections parallel to the substrate material direction of motion are unlikely to yield edge linearity measurements of a magnitude sufficient to reach the minimum threshold for the edge linearity characteristic. The second computing device 110 may, based on this known idiosyncrasy of the mark-applying device 100, under-weight the edge linearity characteristic measurements for the mark 102.

Continuing with FIG. 1, the second computing device 110 uses location identifiers corresponding to a subset of the metrics of the signature to derive an HID (block 210). In one embodiment, the second computing device 110 uses index numbers corresponding to a subset of the highest-magnitude metrics of the signature to derive an HID. As will be discussed in further detail below, the second computing device 110 may, in deriving the HID, use index numbers corresponding to a subset of each set of metrics as a block within an overall HID. The second computing device 110 stores the signature and the HID (e.g., using a database program) in a media storage device 112 (e.g., a redundant array of independent disks) (block 212) such that the HID is associated with the signature. In some embodiments, the HID can also be used to look up the signature (e.g., the second computing device 110 uses a database program to set the HID as an index key for the signature). In some embodiments, the media storage device 112 is made up of multiple devices that are geographically and temporally distributed, as is often the case with cloud storage services. In some embodiments, one or more of the characteristic measuring, analysis of the various sets of metrics, generation of the signature, derivation of the HID, and storage of the signature and the HID are carried out by the first computing device 108. In other embodiments, all of those steps are carried out by the first computing device 108 and the media storage device 112 is directly accessed by the first computing device 108. In the latter embodiment, the second computing device 110 is not used. In still other embodiments, the second computing device 110 transmits the signature and HID to a separate database server (i.e., another computing device), which stores the signature and HID in the media storage device 112.

Continuing with FIG. 1, an unverified physical object 114 ("unverified object 114"), which may or may not be the legitimate physical object 104, needs to be tested to ensure that it is not counterfeit or otherwise illegitimate. Possible embodiments of the unverified object 114 are the same as those of the legitimate physical object 104. On the unverified object 114 is a candidate mark 116. Possible embodiments of the candidate mark 116 are the same as those of the genuine mark 102. A second image-capturing device 118 (e.g., a camera, machine-vision device, or scanner) captures an image of the candidate mark 116 (block 250 of FIG. 2B) and transmits the image to a third computing device 120. As with the first image-capturing device 106 and the first computing device 108, the second image-capturing device 118 may be part of the third computing device 120, and the transmission of the captured image of the candidate mark 116 may be internal (i.e., from the second image-capturing device 118 to logic circuitry of the third computing device 120). The third computing device 120 (or logic circuitry therein) receives the captured image and transmits the captured image to the second computing device 110. The second computing device 110 uses the captured image to measure various characteristics of the candidate mark 116, including the same characteristics that the second computing device 110 measured on the genuine mark 102. The result of this measurement is a set of metrics for the characteristic (block 252). Over successive measurements, the result may include one or more sets of metrics for each of the measured characteristics. The second computing device 110 then generates a signature that is based on the set (or sets) of metrics (block 254), and does so using the same technique it used to generate a signature for the genuine mark 102. If the candidate mark 116 is, in fact, the genuine mark 102 (or generated by the same process as the genuine mark 102), then the signature that the second computing device 110 creates will, like the signature generated from the captured image of the genuine mark 102, be based on the artifacts of the genuine mark 102. If, on the other hand, the candidate mark 116 is not the genuine mark 102 (e.g., is a counterfeit), then the signature generated by this latest image will be based on whatever other characteristics the candidate mark 116 exhibits—artifacts of the counterfeiting process, an absence of artifacts from the mark-applying device 100, etc. The second computing device 110 uses location identifiers corresponding to a subset of the metrics of the signature of the candidate mark 116 (e.g., index numbers of a subset of the highest-magnitude metrics) to derive an HID for the candidate mark 116 (block 256) (in the same manner set forth above with respect to block 210), and compares (e.g., through querying a database) the HID of the candidate mark 116 with HIDs of genuine marks stored in the media storage device 112 (block 258). As an outcome of the comparison, the second computing device 110 either receives no closely-matching results (e.g., no results that pass the predetermined threshold), or receives one or more closely-matching HIDs from the media storage device 114 (block 260). If the second computing device 110 receives no closely-matching results, then the second computing device 110 indicates (e.g., by transmitting a message) to the third computing device 120 indicating that the candidate mark 116 cannot be verified (e.g., transmits a message indicating that the candidate mark 116 is not genuine) (block 262). The third computing device 120 receives the message and indicates, on a user interface, that the candidate mark 116 cannot be verified (or that the candidate mark 116 is counterfeit). In some embodiments, the third computing device 118 carries out one or more of the measuring, generating, and deriving steps, and transmits the signature (or HID, if the third computing device 118 derives the HID) to the second computing device 110.

If, on the other hand, the second computing device 110 finds one or more HIDs that closely-match the HID of the candidate mark 116, then the second computing device 110 will respond by retrieving, from the media storage device 112, the signatures that are associated with the closely-matching HIDs (block 264). The second computing device 110 then compares the actual signature that it generated for the candidate mark 116 with the retrieved genuine signatures (block 266 of FIG. 2C). The second computing device 110 repeats this process for each signature to which a closely-matching HID is associated. If the second computing device 110 is not able to closely-match the signature of the candidate mark 116 with any of the retrieved signatures (block 268), then the second computing device 110 indicates (e.g., by transmitting a message) to the third computing device 120 indicating that the candidate mark 116 cannot be verified (block 270). The third computing device 120 receives the message and indicates, on a user interface, that the candidate mark 116 cannot be verified. If, on the other hand, the second computing device 110 is able to closely-match the signature of the candidate mark 116 with a retrieved signature, then the second computing device 110 indicates (e.g., by transmitting a message) to the third computing device 120 that the candidate mark 116 is genuine (block 272).

Figure 3:
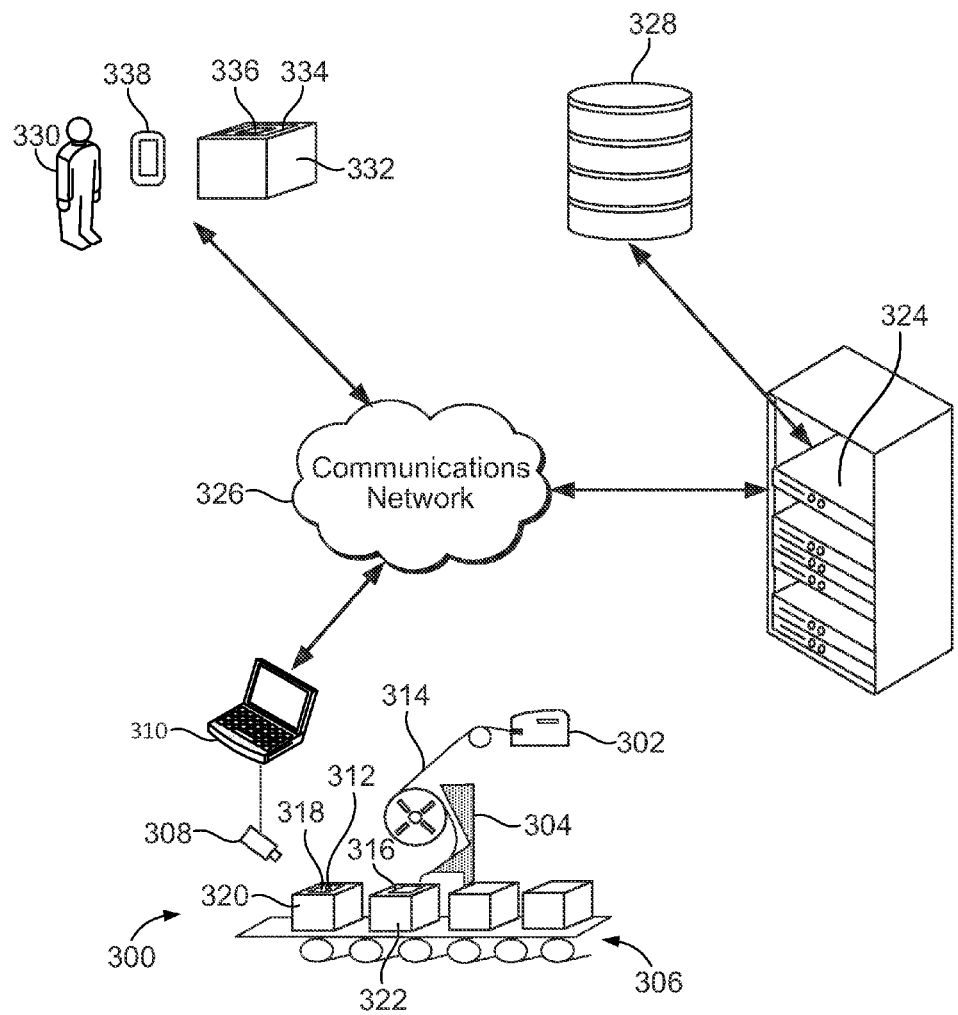

Turning to FIG. 3 an example of a system that may be used in another embodiment is described. Procedures that may be carried out within this system are shown in the flow charts of FIG. 4A, FIG. 4B, and FIG. 4C. FIG. 3, FIG. 4A, FIG. 4B, and FIG. 4C are described here in parallel.

Located at a packaging facility 300 are a label printer 302, a label-applying device 304, a packaging line 306, an image-capturing device 308, and a first computing device 310. The label printer 302 applies genuine marks, including a genuine mark 312 ("mark 312"), to a number of labels that are carried on a label web 314 (block 402 of FIG. 4A). Possible embodiments of a genuine mark include a one-dimensional ("1D") barcode and a 2D barcode. The label applying device 304 applies the labels (including individually-shown labels 316 and 318 of FIG. 3) to legitimate physical objects (block 404), two of which are shown in FIG. 3 with reference numbers 320 and 322 ("first object 320" and "second object 322"). FIG. 3 shows the physical objects as being boxes (e.g., boxes containing manufactured products), but the objects do not have to be boxes or containers. Possible embodiments of the legitimate physical objects include those listed previously for the object 104 of FIG. 1.

The image-capturing device 308 captures an image of the mark 312 (block 406) and transmits the captured image to a first computing device 310. The first computing device 310 receives the captured image and transmits the captured image to a second computing device 324 via a communication network 326 ("network 326"). Possible embodiments of the network 326 include a local-area network, a wide-area network, a public network, a private network, and the Internet. The network 326 may be wired, wireless or a combination thereof. The second computing device 324 receives the captured image and carries out quality measurements on the mark 312 using the image (e.g., such as those set forth in ISO 15415) (block 408). For example, the second computing device 324 may determine whether there is unused error correction and fixed pattern damage in the mark 312. The second computing device 324 then uses the captured image to measure characteristics of the mark 312, resulting in one or more sets of metrics that include data regarding artifacts of the mark 312 (block 410). For example, the second computing device 324 may measure (for all or a subset of subareas of the genuine mark 312): (1) the average pigmentation of some or all of the subareas of the genuine mark 312 (e.g., all or some of the cells), (2) any deviation in the position of the subareas from a best-fit grid, (3) the prevalence of stray marks or voids, and (4) the linearity of one or more edges of the subarea. Each set of metrics corresponds to a measured characteristic, although there may be multiple sets of metrics for a single characteristic. For example, for each subarea being measured—say, one hundred subareas out of one thousand total subareas of the mark 312—there may be a metric for average pigmentation, a metric for deviation from best fit, a metric for the prevalence of stray marks, and three metrics for edge linearity. Thus, the resulting set of metrics would be one hundred metrics for pigmentation, one hundred for deviation for best fit, one hundred metrics for stray marks or voids, and three hundred metrics (three sets of one hundred metrics each) for edge linearity. In an embodiment, each set of metrics is in the form of a list, wherein each entry of the list includes information identifying the position in the mark 312 (e.g., a raster-based index number) from which the second computing device 324 took the underlying measurement and a data value (e.g., a magnitude) derived from the measurement itself.

The second computing device 324 then analyzes the metrics to identify those metrics that will be used to generate an electronic signature for the mark 312 (block 412), and generates the signature based on the analysis (block 414). The second computing device 324 identifies a subset of the highest-magnitude metrics of the signature (block 416), derives an HID block using location identifiers corresponding to the identified subset (block 418), creates an HID based on the HID block (block 420 of FIG. 4A), and stores the HID in association with the signature (block 422) in a media storage device 328 (whose possible implementations are the same as those described for the media storage device 112 of FIG. 1). In some embodiments, the second computing device 324 repeats blocks 416 and 418 for each set of metrics of the signature (e.g., once for the set of measurements for pigmentation, once set of measurements for deviation from a best-fit grid, once for the set of measurements for extraneous marks or voids, and once for each of the three separate sets of measurements for edge linearity). In some embodiments, the first computing device 310 carries out one or more of blocks 402 through 420 and transmits the signature or the HID to the second computing device 324.

Continuing with FIG. 3, at some point in the chain of distribution from the packaging facility 300 to a point of distribution (e.g., a point of sale), a user 330 (e.g., a salesperson or law enforcement worker) handles an unverified physical object 332 ("unverified object 332") that has an unverified label 334 that carries a candidate mark 336. Indicia on the unverified object 332 or information encoded in the candidate mark 336 might suggest that the unverified object 332 originated from a legitimate source, such as the packaging facility 300 (or the company for which the packaging facility 300 is handling the original objects on the packaging line 306). In this scenario, the user 330 wishes to determine whether the unverified object 332 is counterfeit or otherwise illegitimate.

The user 330 launches an application on a third computing device 338 which, in FIG. 3, is depicted as a smartphone. The third computing device 338, under control of the application (and possibly in response to additional input from the user 330) captures an image of the candidate mark 336 (block 450 of FIG. 4B) (e.g., using a camera 514, depicted in FIG. 5). The third computing device 338 decodes the explicit data in the candidate mark 336 (block 452) (e.g., data in a bar code, which indicates the identity of a product to which the bar code is applied), and transmits the captured image to the second computing device 324 via the network 326. The second computing device 324 then uses the captured image to measure a characteristic of the candidate mark 336, resulting in one or more sets of metrics (block 454), resulting in one or more sets of metrics for each of the measured characteristics. The second computing device 324 then analyzes the metrics to identify those metrics that will be used to generate an electronic signature for the mark 336 (block 456), and generates the signature based on the analysis (block 458). The second computing device 324 may repeat blocks 454 and 456 for each characteristic to be measured for the mark, and even repeat these blocks multiple times for a single characteristic (yielding a "signature-worthy" set of metrics on each iteration). The second computing device 324 identifies a subset of the highest-magnitude metrics of the signature (block 460) and derives an HID block the set of metrics (of the signature) using location identifiers associated with the identified subset (block 462). The second computing device 324 may repeat blocks 454 and 456 for each set of metrics of the signature, yielding multiple HID blocks (in essence, one HID block for each set of metrics). In some embodiments, the third computing device 338 carries out blocks 454 through 462 and transmits the signature or HID to the second computing device 324. The second computing device 324 then carries out the procedures described above with respect to FIG. 2B and FIG. 2C, which are reproduced in FIG. 4B and FIG. 4C. In other words, the second computing device 324 carries out blocks 464, 466, 468, 470, 472, 474, 476, and 478 of FIG. 4B and FIG. 4C in the same fashion that the second computing device 110 of FIG. 1 carried out blocks 258, 260, 262, 264, 266, 268, 270, and 272 of FIG. 2B and FIG. 2C.

Figure 5:
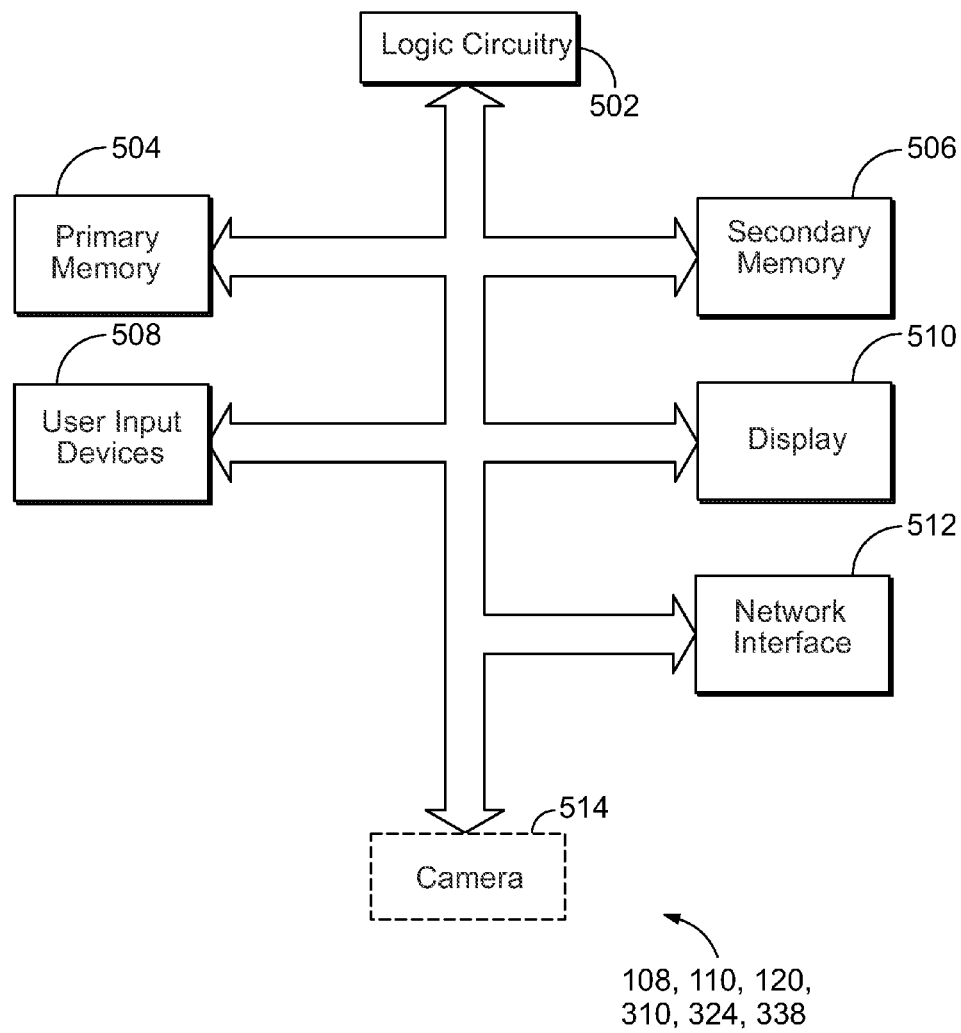
FIG. 5 shows the architecture of a computing device according to an embodiment.

In one implementation, one or more of the computing devices 108, 110, and 120 of FIG. 1 and one or more of the computing devices 310, 324, and 338 of FIG. 3 have the general architecture shown in FIG. 5. The device depicted in FIG. 5 includes logic circuitry 502, a primary memory 504 (e.g., volatile memory, random-access memory), a secondary memory 506 (e.g., non-volatile memory), user input devices 508 (e.g., a keyboard, mouse, or touchscreen), a display 510 (e.g., an organic, light-emitting diode display), and a network interface 512 (which may be wired or wireless). The memories 504 and 506 store instructions and data. Logic circuitry 502 executes the instructions and uses the data to carry out various procedures including, in some embodiments, the methods described herein (include, for example, those procedures that are said to be carried out by a computing device). Some of the computing devices may also include a camera 514 (e.g., the third computing device 338, particularly if it is implemented as a mobile device).

Figure 6:
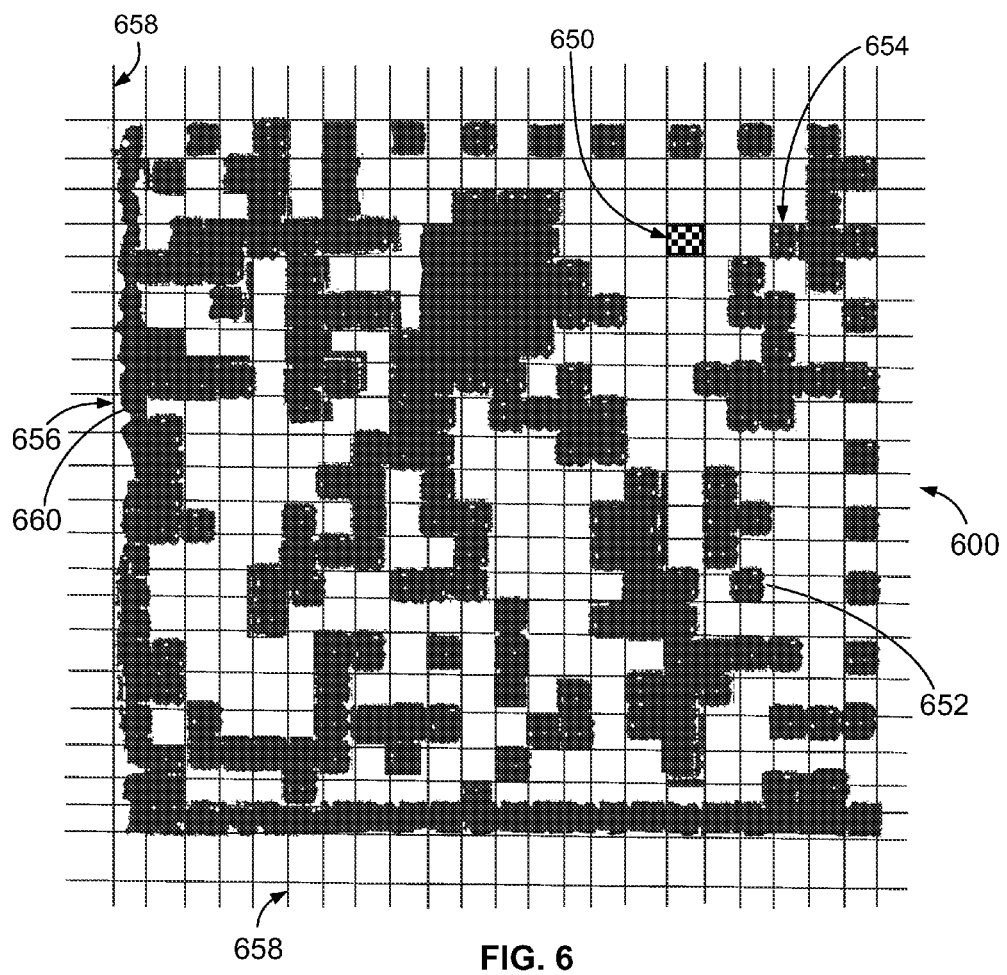
FIG. 6 shows an example of a mark according to an embodiment.

In an embodiment, a genuine mark (such as the genuine mark 312 of FIG. 3) is made up of a number of locations referred to herein as "subareas." The subareas may correspond to "cells" according ISO/IEC 15415 and may be uniformly-sized. To help illustrate some of the concepts discussed herein, attention is directed to FIG. 6, which illustrates a mark 600 having a first subarea 650, a second subarea 652, a third subarea 654, and a fourth subarea 656. A characteristic of the first subarea 650 is that its average pigmentation deviates significantly (e.g., to a degree that exceeds a predetermined threshold) from other subareas. A characteristic of the second subarea 652 is that its offset from a best-fit grid 658 is significantly higher than that of other subareas. A characteristic of the third subarea 654 is that it includes significantly higher incidence of voids than other subareas. Finally, a characteristic of the fourth subarea 656 is that it includes an edge 660 whose linearity is significantly less than edges of other subareas.

In an embodiment, to carry out the process of analyzing the metrics obtained from measuring characteristics of a mark (such as in block 412 of FIG. 4A and block 456 of FIG. 4B), a computing device (such as the second computing device 324) performs the following tasks. The computing device generates the best-fit grid 658. In doing so, the computing device identifies ideal locations for boundaries between the various subareas of the mark. The computing device selects subareas whose characteristic measurements are to be used for generating the signature for the mark. In an embodiment, the computing device carries out this selection based on which subareas have characteristics whose measurements deviate the most (e.g., above a predetermined threshold) from a normal or optimal measurement expected for that subarea. Examples of the kind of subareas that the computing device would select in this scenario include:

(1) Subareas whose average color, pigmentation, or intensity are closest to the global average threshold differentiating dark cells from light cells as defined by a 2D barcode standard—i.e., the "lightest" dark cells and the "darkest" light cells. The first subarea 650 falls within this category. In an embodiment, if the computing device identifies a given subarea as having a deviant average pigmentation density, the computing device may need to reassess subareas for which the identified subarea was a nearest neighbor. When the computing device carries out such reassessment, the computing device may discount the identified subarea as a reference.

(2) Subareas whose position deviates the most (e.g., above a predetermined threshold) from an idealized location as defined by the best-fit grid 658. In some embodiments, the computing device determines whether a given subarea falls into this category by identifying the edges of the subarea, determining the positions of the edges, and comparing the positions of the edges to their expected positions, which are defined by the best-fit grid 658. In other embodiments, the computing device generates a histogram of the boundary region between two adjacent subareas of opposite polarity (e.g., dark/light or light/dark), with the sample region overlapping the same percentage of each subarea relative to the best-fit grid 658, and evaluates the deviation of the histogram from a 50/50 bimodal distribution. The second subarea 652 falls within this category.

(3) Subareas that contain extraneous markings or voids, either light or dark. In an embodiment, the computing device determines whether a subarea falls within this category by generating a luminance histogram for the subarea and determining whether the distance between the outermost dominant modes of the histogram is sufficiently (e.g., above a pre-determined threshold) great. The third subarea 654 falls within this category.

(4) Subareas having one or more edges that have one or more of (a) a length that exceeds a pre-determined threshold, (b) continuity for a length that exceeds (or falls below) a predetermined threshold), and (c) a linearity that exceeds (or falls below) a predetermined threshold. In an embodiment, the computing device determines whether a subarea falls within this category by calculating a pixel-wide luminance value over the length of one subarea, offset from the best-fit grid 658 by the length of half of a subarea, run perpendicular to the grid line bounding that edge in the best-fit grid 658. The fourth subarea 656 falls within this category.

After the computing device measures the characteristics of the mark (genuine or candidate), the computing device makes the measured characteristics of the mark available as an index-array associated list (associable by subarea (e.g., cell) position in the mark).

Figure 7:
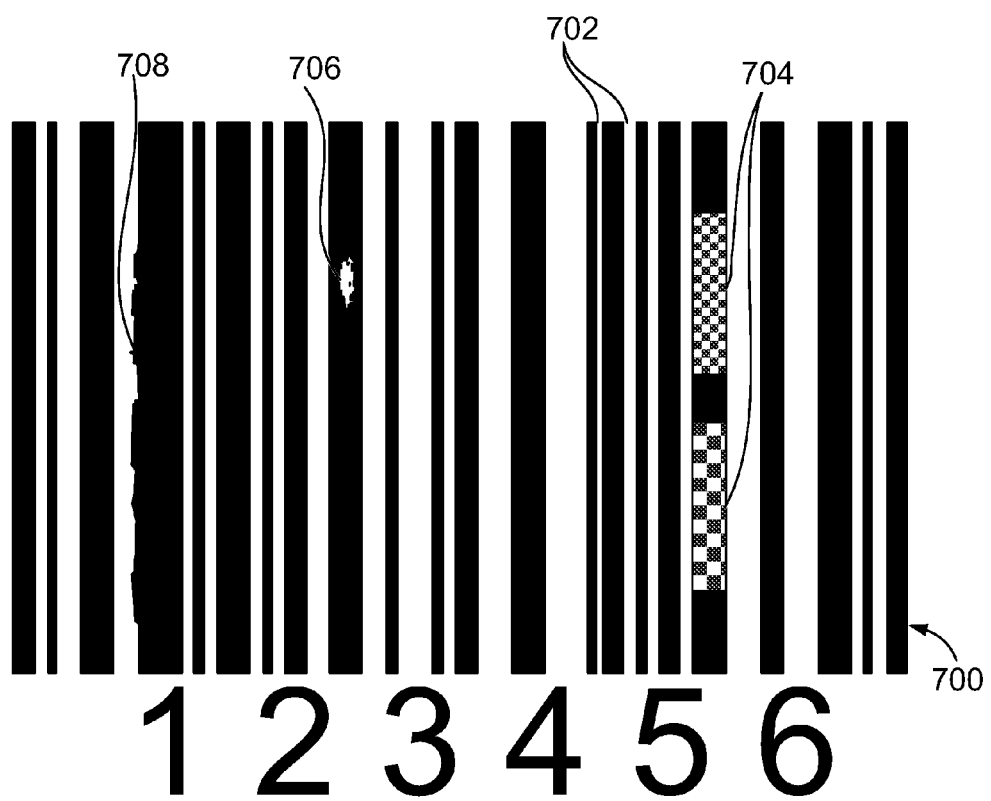
FIG. 7 shows an example of a mark according to another embodiment.

Turning to FIG. 7, in another example, assume that the mark being analyzed is a 1D linear barcode 700. Features that a computing device (such as the second computing device 324) may use to form an electronic signature include: variations 702 in the width of or spacing between bars; variations 704 in the average color, pigmentation or intensity; voids 706 in black bars (or black spots in white stripes); and irregularities 708 in the shape of the edges of the bars.

Figure 8:
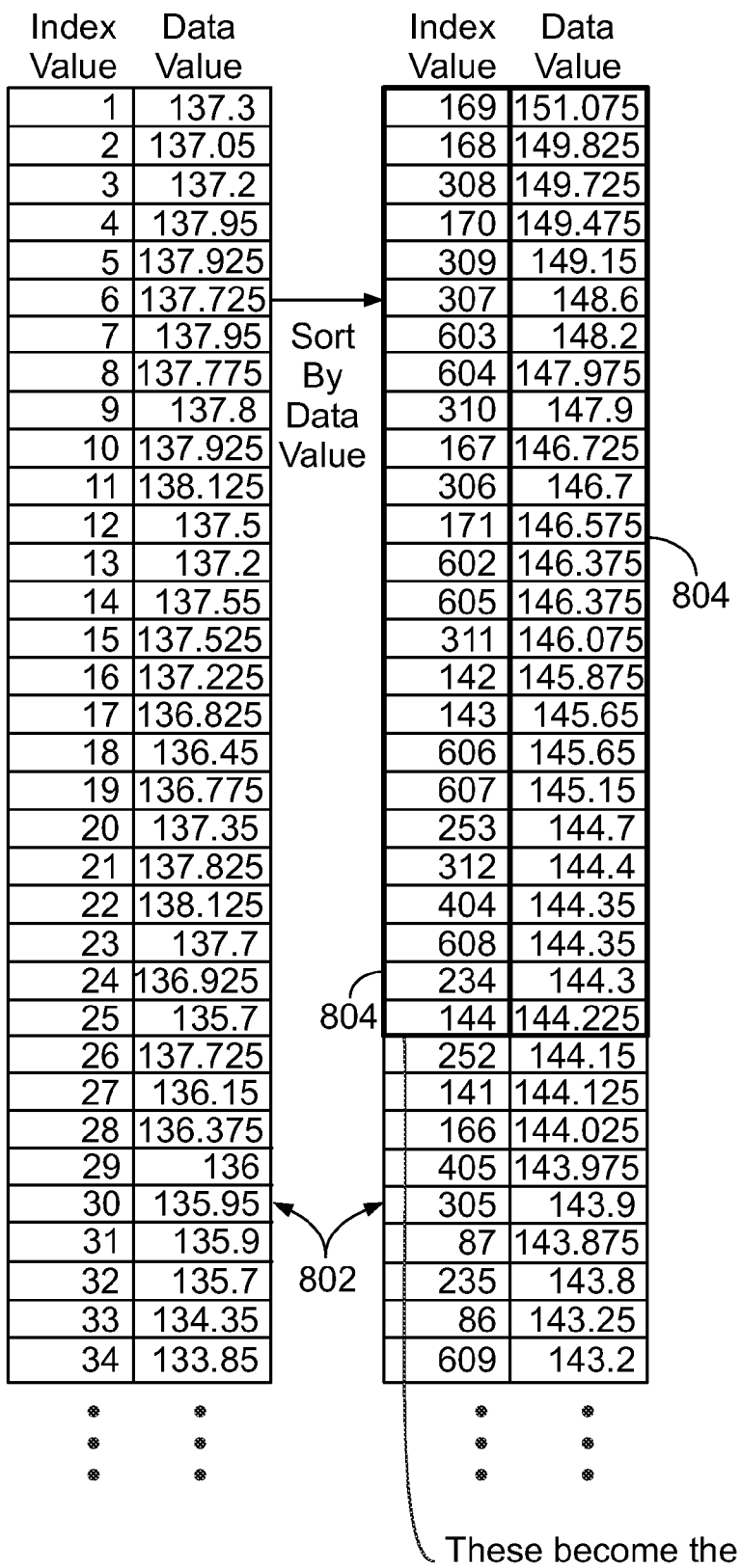
FIG. 8 shows an example of how a computing device sorts a set of metrics and selects the location identifiers of a subset of the metrics according to an embodiment.
Figure 9:
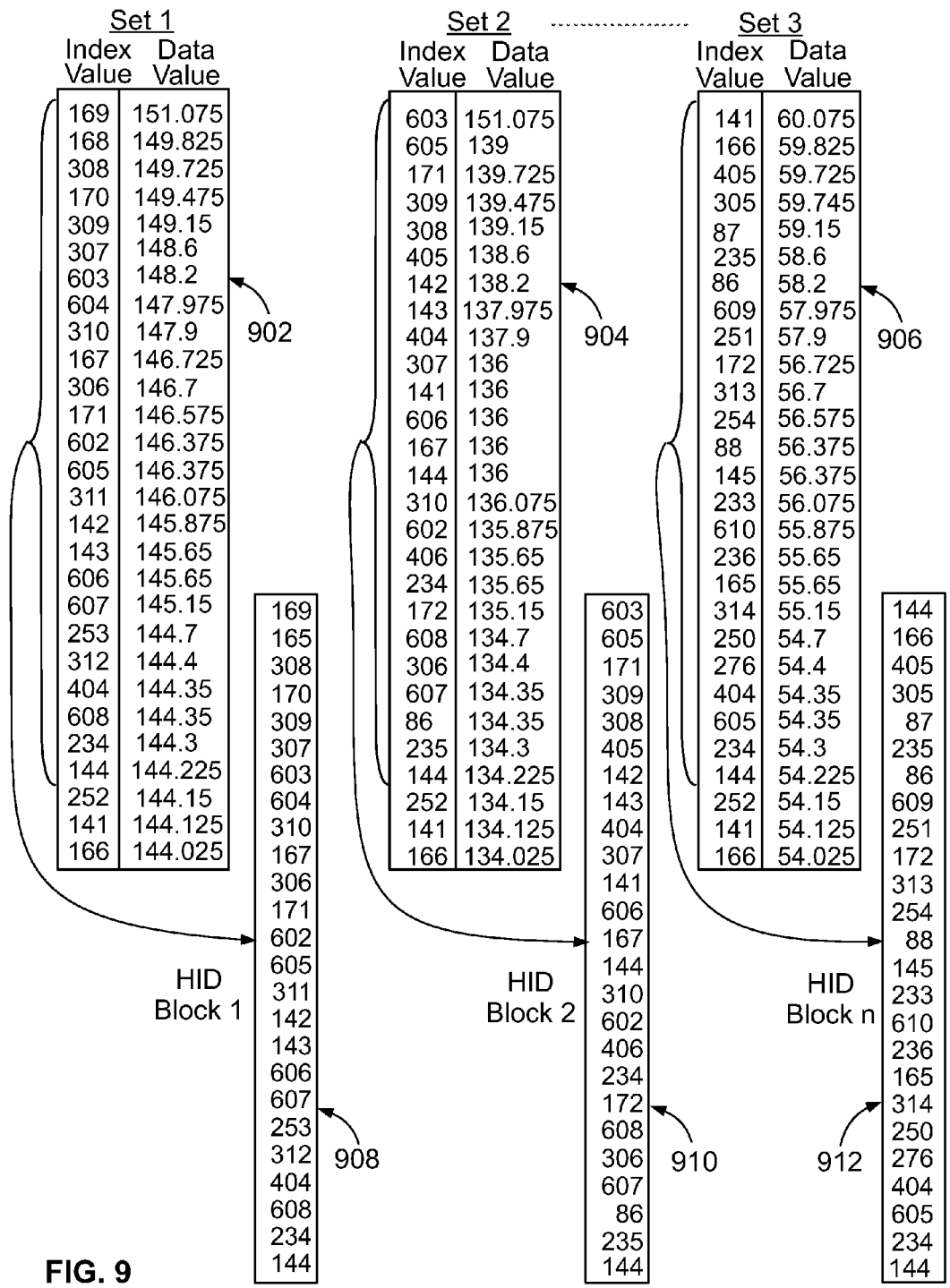
FIG. 9 shows an example of how a computing device forms a hash identifier blocks from location identifiers corresponding of multiple subsets of metrics according to an embodiment.

Turning to FIG. 8 and FIG. 9, the process that a computing device (such as the second computing device 324) carries out to identify a subset of the highest magnitude metrics of the electronic signature for a mark at block 416 of FIG. 4A and block 460 of FIG. 4B (and derive an HID from the location identifiers associated with the subset) will now be described. For each measured characteristic (and for each set of metrics for a characteristic in those cases where a characteristic is measured multiple times) the computing device takes the set of metrics that make up part of an electronic signature and sorts the set by value. In FIG. 8, for example, a first set 802 of metrics (depicted as a list) represents the pigmentation for various cells of a 2D barcode, with each cell having an associated index number. The data for each cell is unitless at this point, but when the computing device originally took the pigmentation measurement, it did so in terms of gray value. The first set 802 is just one of multiple sets of metrics that make up the electronic signature for the 2D barcode. The computing device sorts the first set 802 by the magnitude of the data value and extracts a subset 804 of index numbers corresponding to a subset 806 of the highest-magnitude data values. The computing device then makes the subset 804 of index values an HID block for the first set 802 of metrics.

In another example, in FIG. 9, a first set 902 of metrics corresponds to a first characteristic of the mark (e.g., the genuine mark 312 or the candidate mark 336), a second set 904 of metrics corresponds to a second characteristic of the mark, and a third set 906 of metrics (the "nth set" or final set) corresponds to a third characteristic of the mark. There may be any number of sets of metrics, however. Each member of each set of metrics in this example includes (1) an index value, which correlates with the raster position of the subarea of the mark from which a measurement of the characteristic was obtained, and (2) a data value, which is a magnitude that is either the measurement itself or is derived from the measurement (e.g., after some statistical processing and normalization). The computing device sorts each set of metrics by data value. For each set of metrics, the computing device extracts the index values corresponding to a highest-magnitude subset of the data values. In this example, each highest-magnitude subset is the top twenty-five data values of a set of metrics. The computing device derives a first HID block 908 from the index values corresponding to the highest-magnitude subset of the first set 902 of metrics. The computing device similarly derives a second HID block 910 from the index values corresponding to the highest-magnitude subset of the second set 904 of metrics. The computing device continues this process until it has carried out this process for each of the sets of metrics (i.e., through the nth set 906 of metrics to derive a third or "nth" HID block 912), resulting in a set of HID blocks. The computing device forms the HID by aggregating the HID blocks. In this example, the HID blocks contain the extracted index values themselves.

Figure 4A:
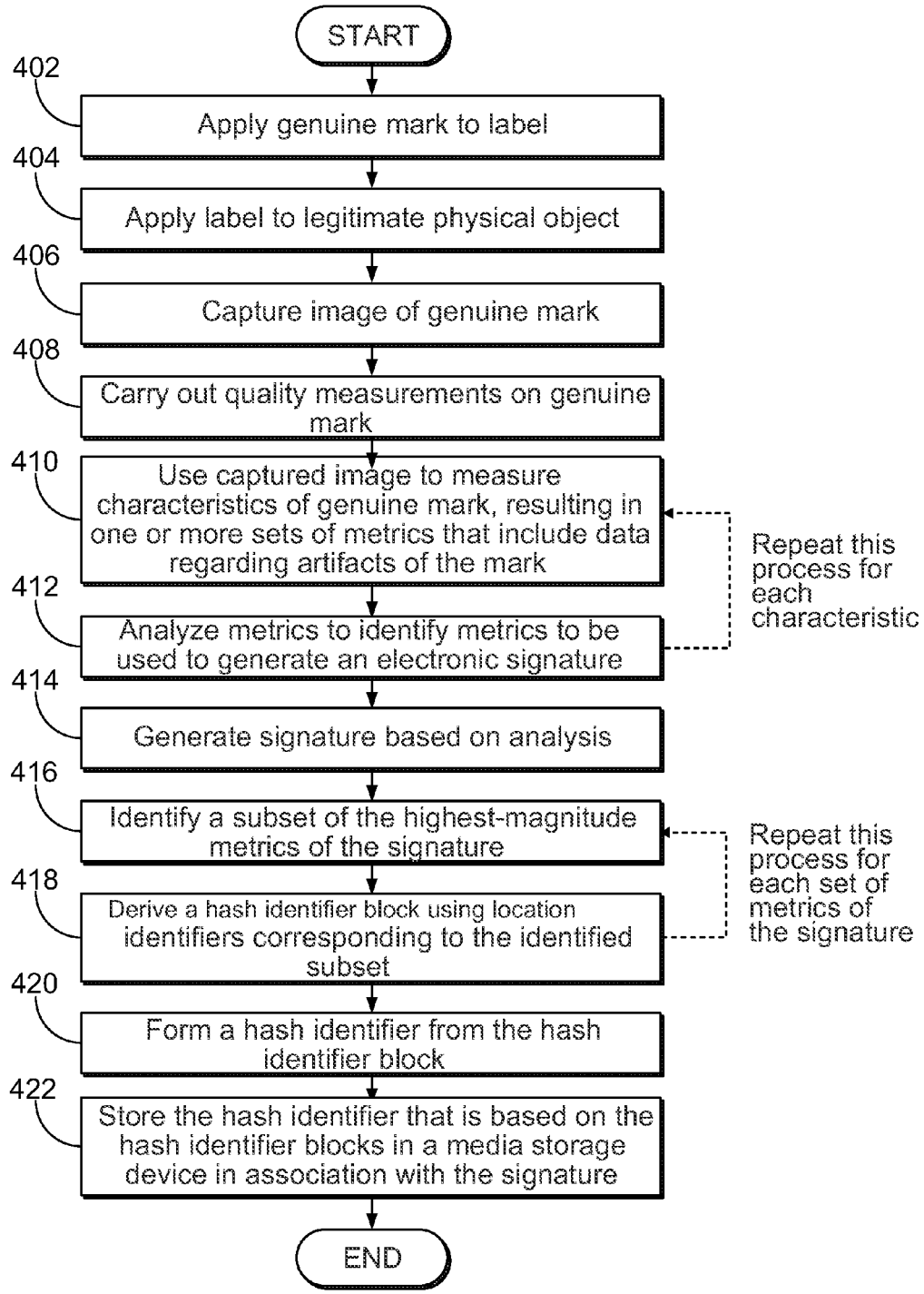
Figure 4B:
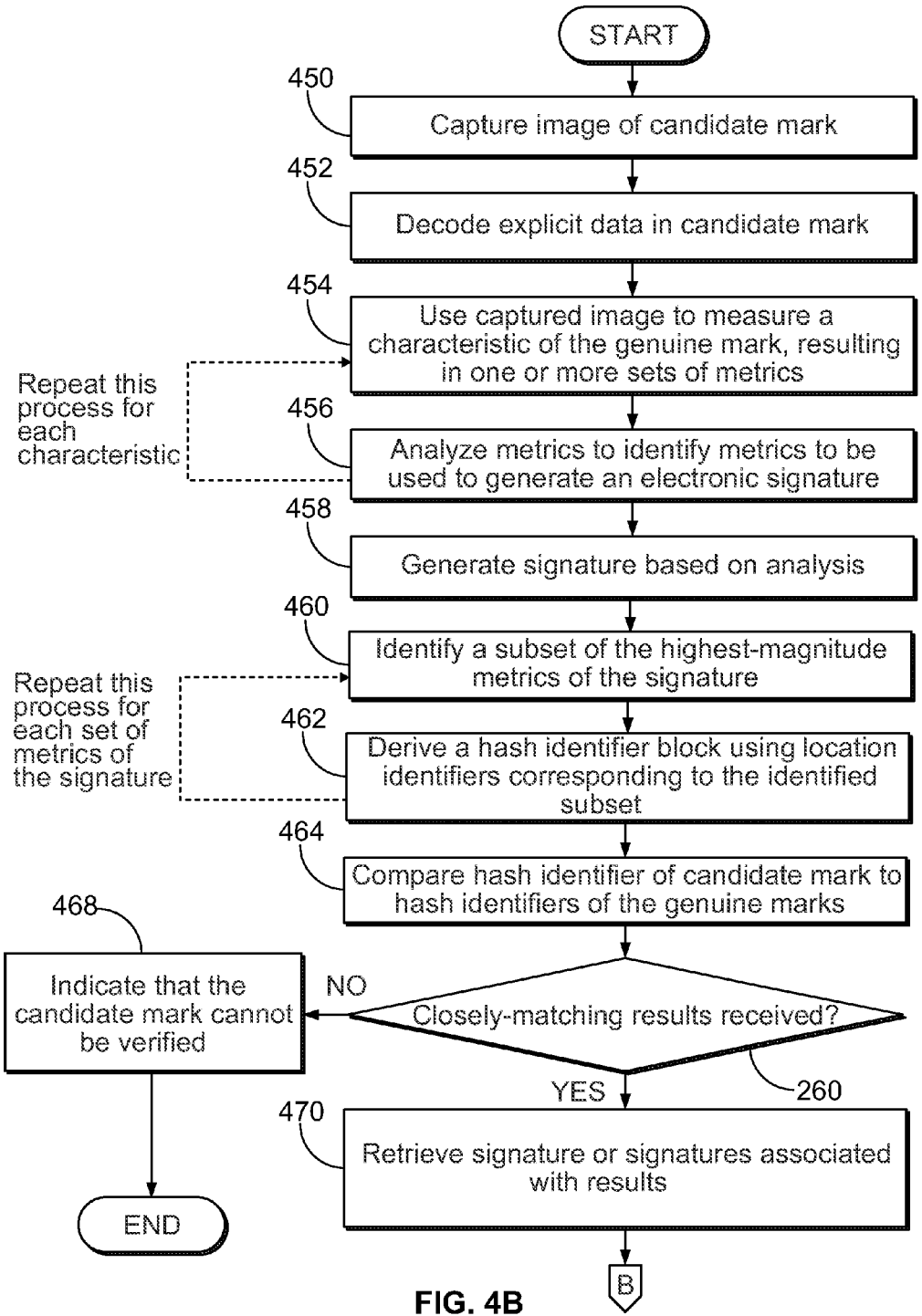
Figure 10:
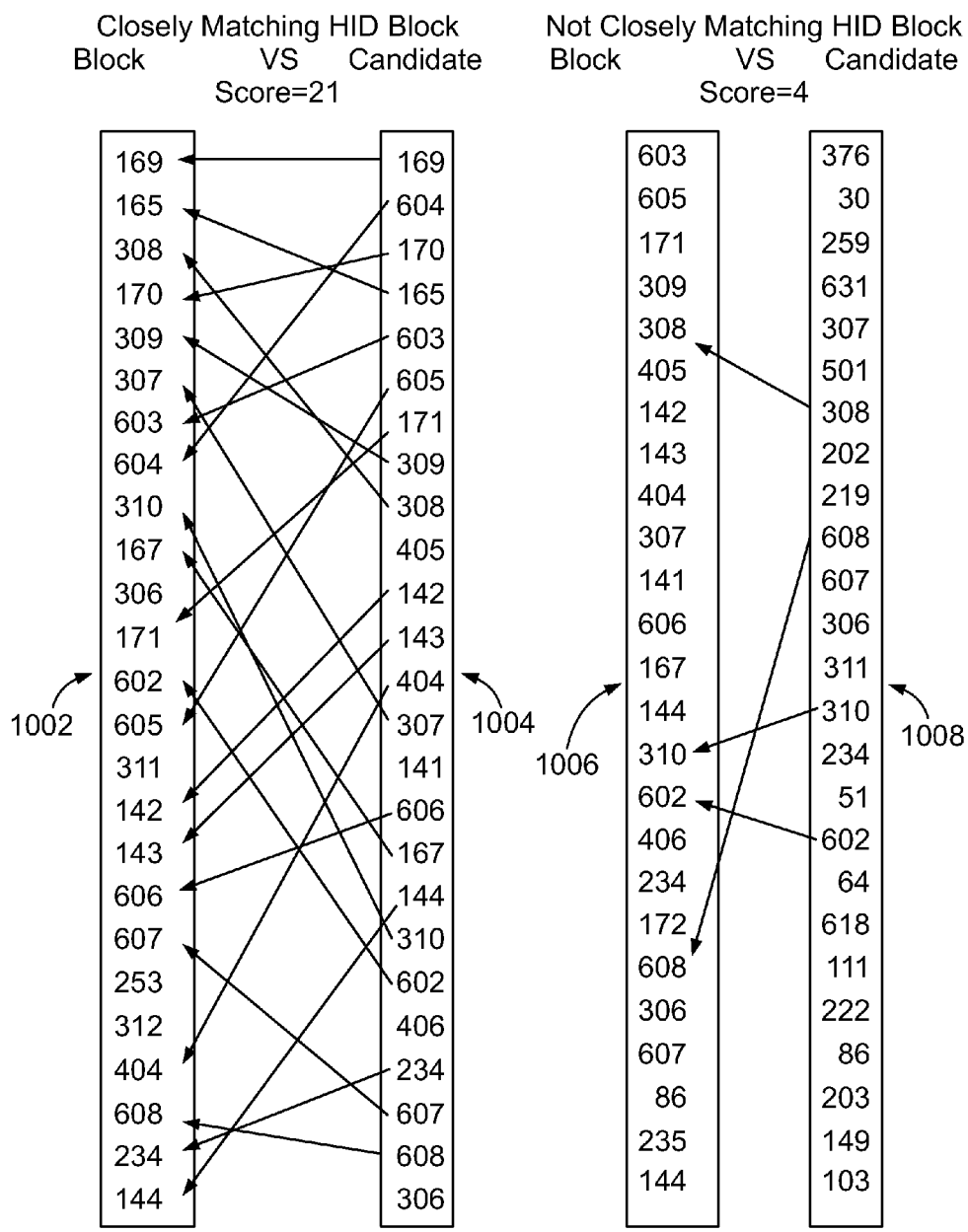
FIG. 10 shows an example of how a computing device compares two hash-identifier blocks and scores the results of the comparison in an embodiment.

Turning to FIG. 10, an example of how a computing device (e.g., the second computing device 324) compares an HID generated for a candidate mark to an HID of a genuine mark (e.g., as described in conjunction with blocks 464 and 466 in FIG. 4B) according to an embodiment is shown. The computing device attempts to match index values that make up the respective HID blocks of the candidate mark and the genuine mark, with like sets of index values being matched against one another for an "apples to apples" comparison (e.g., the extracted subset of the index values for pigmentation of the candidate mark is compared to the extracted subset of the index values for pigmentation of the genuine mark). The computing device counts each match towards a match score. Thus, for example, the block 1002 of the genuine mark and the block 1004 of the candidate mark have a match score of 21, while the block 1006 of the candidate mark and the block 1008 of the genuine mark have a match score of 4.

Figure 11:
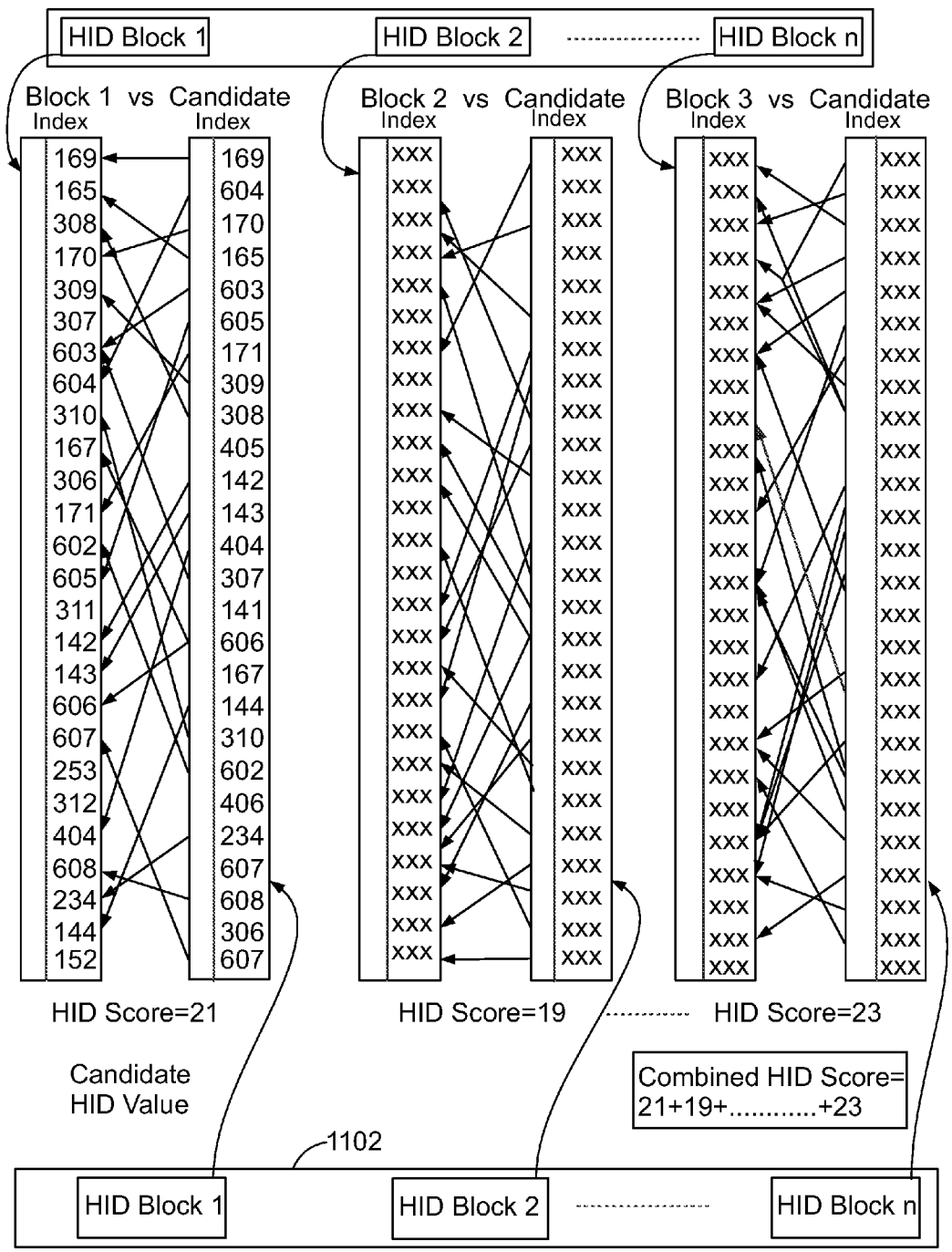
FIG. 11 shows an example of how a computing device combines multiple hash-identifier blocks into an overall hash identifier in an embodiment.

Turning to FIG. 11, an example of how a computing device (e.g., the second computing device 324) compares an overall HID of a genuine mark with that of a candidate mark according to an embodiment is described. The computing device takes each individual HID block of an HID value 1100 of a genuine signature and compares it to the corresponding block of an HID value 1102 of a candidate signature and assigns a match score (e.g., as described above with respect to FIG. 10). The computing device then combines each of the scores into an overall match score. If the overall match score meets or exceeds a predetermined threshold score, then the computing device deems the HIDs to be closely matched. For example, the computing device may use a predetermined threshold score of 120, meaning that if the score is 120 or more, then the computing device would deem the two HIDs to be closely matching. This threshold could be as low as zero. In some embodiments the computing device disregards the minimum and simply take the "top <n>" HID scores (e.g., the top 10). In such a case, the computing device would consistently be performing a test on the top 10 best HID matches. This addresses the possibility of having an inaccurate HID cutoff and thereby generating a false negative through the filtering step (at the expense of unnecessary computations on actual non-genuine candidates). The computing device then retrieves the signature associated with the genuine HID value 1100. The computing device repeats this process until it has compared the candidate HID value 1102 with a number (perhaps all) of the HID values stored in a database of genuine mark signatures. The outcome of this process will be a subset of the whole set of genuine mark signatures, each of which the computing device can then compare (via a more "brute force" method) to the signature of the candidate mark.

According to various embodiments, a computing device compares one electronic signature (e.g., of a candidate mark) with another electronic signature (e.g., of a genuine mark) (e.g., at blocks 266 and 472) as follows. The computing device (e.g., the second computing device 324) array-index matches the raw sets of metrics of the two marks for each characteristic. The computing device also subjects each raw set of the genuine mark to normalized correlation to a like-order extracted metric set from a candidate mark. The computing device then uses the correlation results to arrive at a match/no match decision (genuine vs. counterfeit).

For example, the computing device compares the candidate signature with the genuine signature by comparing the autocorrelation series of the sorted metrics of the candidate mark with the autocorrelation series of the (stored) sorted genuine signature. For clarity, the well-known statistical operation:

$$r_{xy} = \frac{n\sum x_i y_i - \sum x_i \sum y_i}{\sqrt{n\sum x_i^2 - (\sum x_i)^2} \sqrt{n\sum y_i^2 - (\sum y_i)^2}}$$

is the common Normalized Correlation Equation, where r is the correlation result, n is the length of the metric data list, and x and y are the metrics data sets for the genuine mark and the candidate mark, respectively. When the computing device carries out the autocorrelation function, the data sets x and y are the same.

To produce the autocorrelation series according to an embodiment, the computing device carries out the operation set forth in the Normalized Correlation Equation multiple times, each time offsetting the series x by one additional index position relative to the series y (remembering that y is a copy of x). As the offset progresses, the data set "wraps" back to the beginning as the last index in the y data series is exceeded due to the x index offset. According to an embodiment, the computing device accomplishes this by doubling the y data and "sliding" the x data from offset 0 through offset n to generate the autocorrelation series.

In some embodiments, at block 212 in FIG. 2A and at block 422 in FIG. 4A, instead of storing the entire signature in the media storage device, the second computing device instead stores a set of polynomial coefficients that describe (to a predetermined order and precision) a best-fit curve matching the shape of the autocorrelation results. This is feasible because the second computing device carries out the process of generating the signature on sorted metrics data and, as a result, the autocorrelation series for the characteristic data (i.e., the metrics that help represent the artifacts within the genuine mark) is typically a simple polynomial curve.

Figure 12:
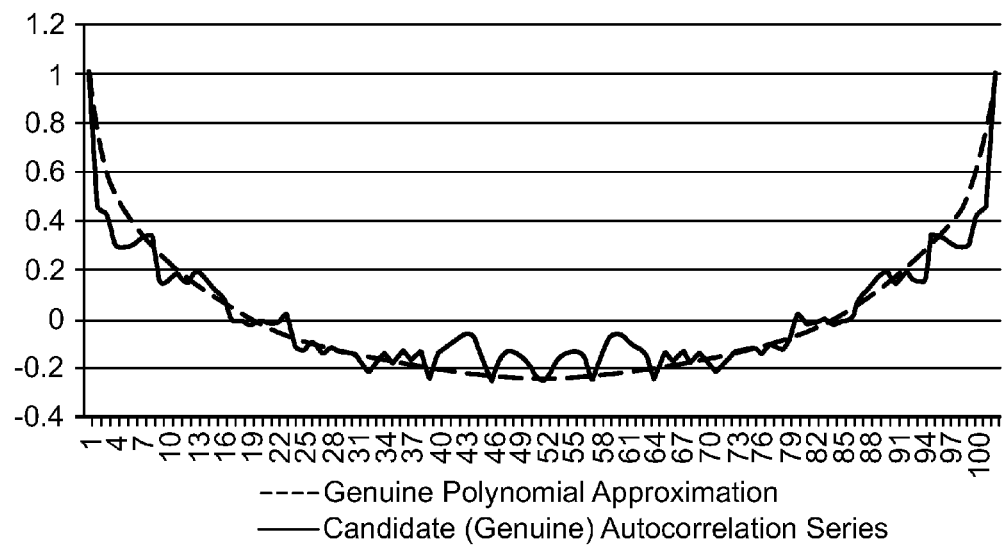
FIG. 12 and FIG. 13 illustrate the process that a computing device carries out to convert the degree of correlation between the two sets of autocorrelated values for a given characteristic (or given set of metrics for a characteristic) to a match score for that characteristic or set of metrics in an embodiment.

In an embodiment, a computing device (e.g., the second computing device 110 or second computing device 324) computes $r_{xy}$, where each term $x_i$ is an artifact represented by its magnitude and location, and each term $y_i = x_{(i+j)}$, where j is the offset of the two datasets, for j=0 to (n−1). Because the $x_i$ are sorted by magnitude, and the magnitude is the most significant digits of $x_i$, there is a very strong correlation at or near j=0, falling off rapidly towards j=n/2. Because y is a copy of x, j and n−j are interchangeable, the autocorrelation series forms a U-shaped curve, an example of which is shown in FIG. 12, which is necessarily symmetric about j=0 and j=n/2. Thus, the computing device in this embodiment need only calculate half of the curve, although in FIG. 12 the whole curve from j=0 to j=n is shown for clarity.

Figure 2C:
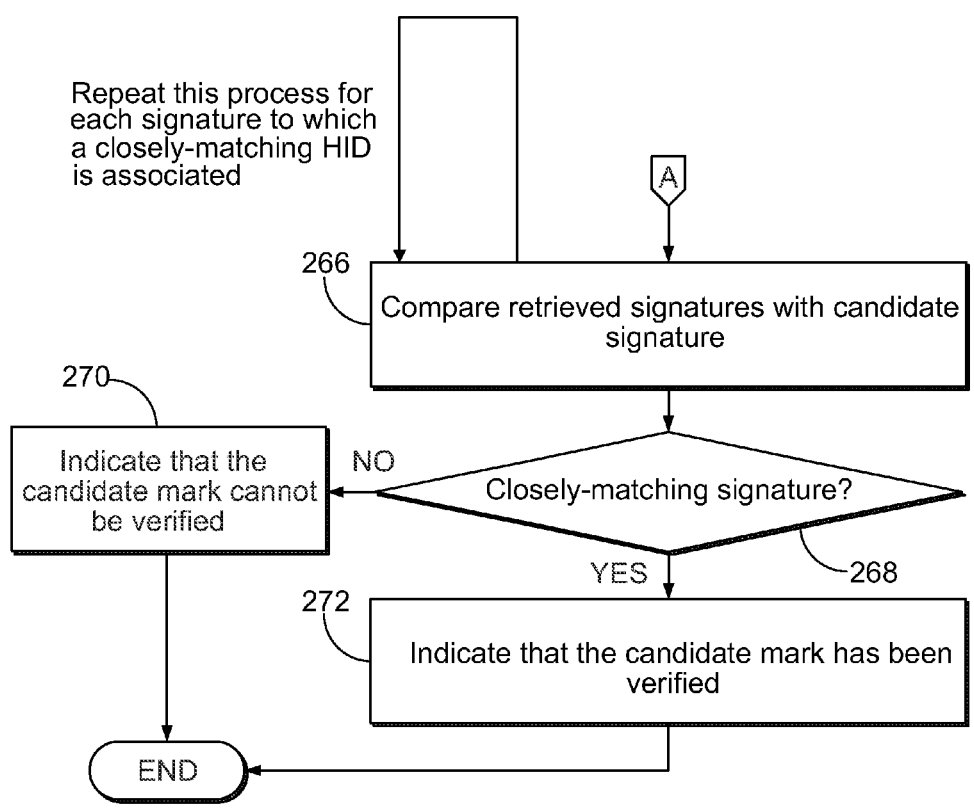
Figure 4C:
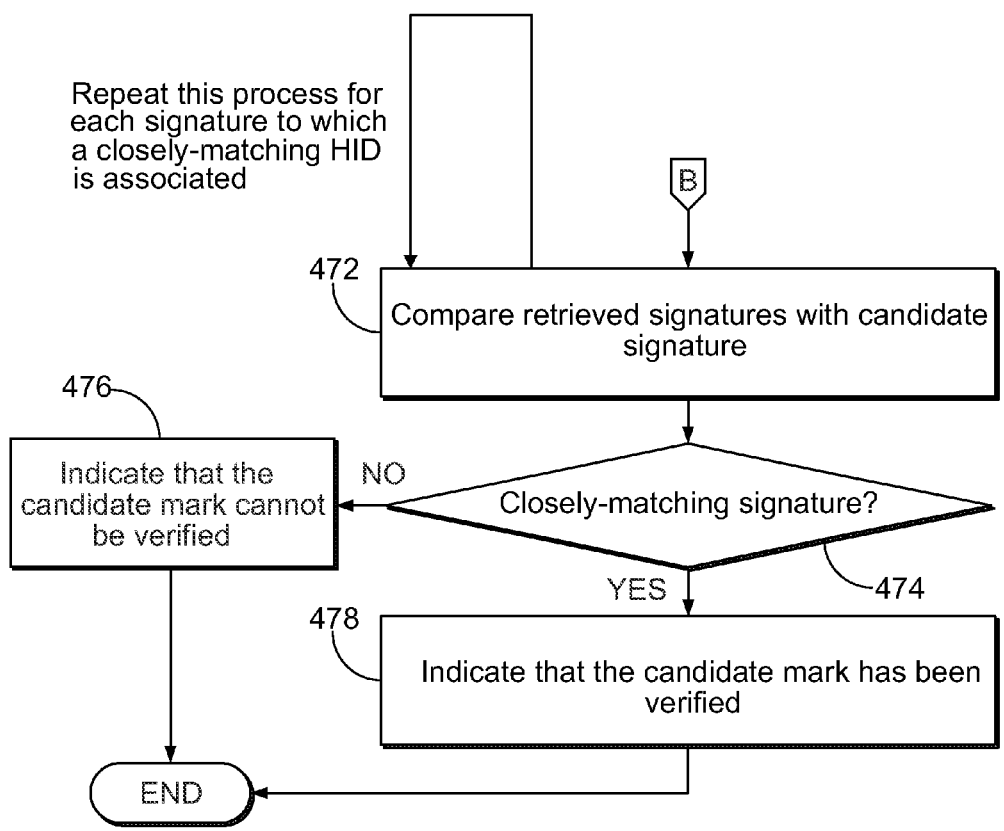

In one implementation, a computing device (such as the second computing device 110 or second computing device 324) carries out block 266 of FIG. 2C or block 472 of FIG. 4C using the actual autocorrelation numbers, and then repeats the process on the candidate mark using the polynomial-modeled curve. In practice, it has been found that a 6th-order equation using six-byte floating-point values for the coefficients will tend to match the genuine signature data within a one percent curve fit error or "recognition fidelity." The resulting match scores that the computing device obtains may be within one percent of one another. This may be true of both the high match score (as would be expected if the candidate mark was genuine) and of a low match score (as would be expected if the candidate mark was not genuine).

In an embodiment, a computing device that analyzes metrics of a mark for the purpose of generating an electronic signature (e.g., as set forth in block 412 of FIG. 4A, and block 456 of FIG. 4B) bounds and normalizes the metrics that it uses to generate the signature. For example, the computing device may express the polynomial coefficients to a fixed precision, express the autocorrelation data itself as values between −1 and +1, and use, as the sort order list, the array index location within the analyzed mark (genuine or candidate). If the mark being analyzed is a 2D data matrix, the array index may be a raster-ordered index of cell position within the mark, ordered from the conventional origin datum for the symbology being used. In one common type of 2D data matrix, the origin is the point where two solid bars bounding the left and bottom sides of the grid meet.

Figure 13:
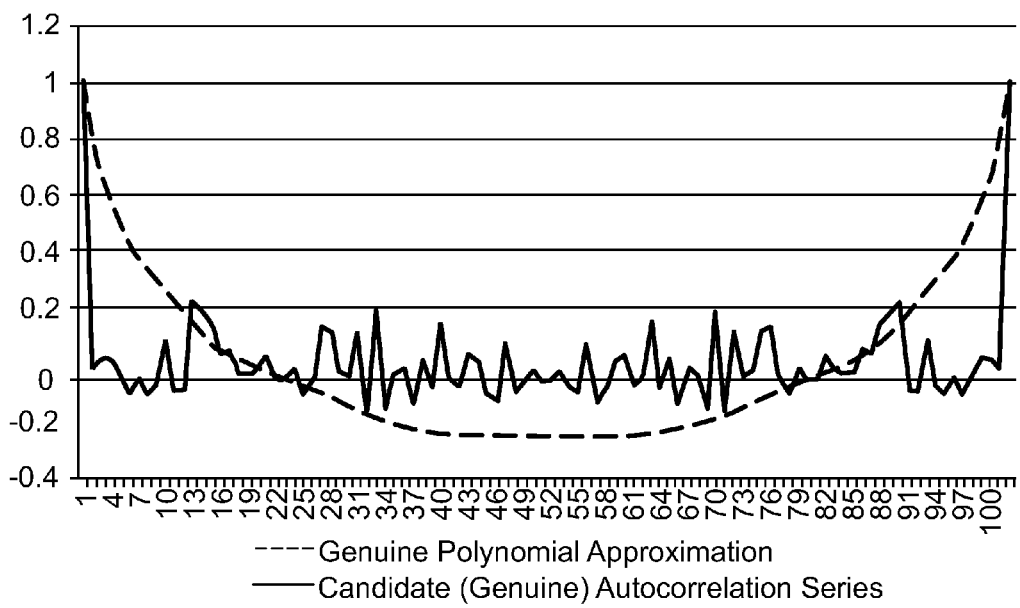

According to an embodiment, a computing device compares (attempts to match) the genuine signature with the candidate signature (e.g., as set forth in block 266 of FIG. 2C or block 472 of FIG. 4C) as follows. The computing device reconstitutes the signatures using the stored polynomial coefficients, autocorrelates the metrics in each list (i.e., for each characteristic measured) to generate polynomial coefficients, and compares the two sets of polynomial coefficients (compares the two autocorrelation series). The computing device may carry out this comparison in a number of ways. For example, the computing device may attempt to correlate the autocorrelation series of the candidate mark against the (reconstituted) autocorrelation curve of the signature of the genuine mark. Alternatively, the computing device may construct a curve for each of the autocorrelation series (candidate and genuine) and performing a curve-fit error on the pair of curves. FIG. 12 and FIG. 13 illustrate this process. The degree of correlation between the two sets autocorrelated values for a given characteristic (or given set of metrics for a characteristic) becomes a match score for that characteristic or set of metrics. The computing device then determines whether the candidate mark is genuine or not basic on all of the match scores for the various characteristics.

In an embodiment, a computing device that analyzes metrics of a mark for the purpose of generating an electronic signature (e.g., as set forth in block 412 of FIG. 4A, and block 456 of FIG. 4B) applies a power series analysis to the autocorrelation data for the candidate mark and to the autocorrelation data for the genuine mark. The computing device may apply such a power series analysis using a discrete Fourier transform ("DFT"):

$$X_k = \sum_{n=0}^{N-1} x_n \cdot e^{-i2\pi kn/N}$$

where $X_k$ is the $k^{th}$ frequency component, N is the length of the list of metrics, and x is the metrics data set. The computing device calculates the power series of the DFT, analyzes each frequency component (represented by a complex number in the DFT series) for magnitude, and discards the phase component. The resulting data describes the distribution of the metric data spectral energy, from low to high frequency, and it becomes the basis for further analysis. Examples of these power series are shown graphically in FIG. 14, FIG. 15, and FIG. 16.

In an embodiment, a computing device that analyzes metrics of a mark for the purpose of generating an electronic signature (e.g., as set forth in block 412 of FIG. 4A, and block 456 of FIG. 4B) employs two frequency-domain analytics: Kurtosis and Distribution Bias. In this context, Distribution Bias refers to a measure of energy distribution around the center band frequency of the total spectrum. To carry out Kurtosis, the computing device may use the following equation:

$$\text{kurtosis} = \frac{\sum_{n=1}^{N}(Y_n - \overline{Y})^4}{N(N-1)s^4}$$

where $\overline{Y}$ is the mean of the power series magnitude data, s is the standard deviation of the magnitudes, and N is the number of analyzed discrete spectral frequencies.

To calculate the Distribution Bias in an embodiment, the second computing device uses the following equation:

$$\text{Distribution Bias} = \frac{\sum_{n=0}^{(\frac{N}{2})-1} x_n - \sum_{n=N/2}^{N} x_n}{\sum_{n=0}^{N} x_n}$$

where N is the number if analyzed discrete spectral frequencies.

When using frequency-domain analytics (e.g., using the DFT) in an embodiment, a computing device considers the following criteria: The smooth polynomial curve of the signature of a genuine mark (arising from the by-magnitude sorting) yields recognizable characteristics in the spectral signature when analyzed in the frequency domain. A candidate mark, when the metrics data are extracted in the same order as those extracted from the genuine mark, will present a similar spectral energy distribution if the symbol is genuine. In other words, the genuine sort order "agrees" with the candidate's metric magnitudes. Disagreement in the sorted magnitudes, or other superimposed signals (such as photocopying artifacts), tend show up as high-frequency components that are otherwise absent in the genuine symbol spectra, thus providing an additional measure of mark authenticity. This addresses the possibility that a counterfeit autocorrelation series might still satisfy the minimum statistical match threshold of the genuine mark. The distribution characteristics of the DFT power series of such a signal will reveal the poor quality of the match via the high frequencies present in the small amplitude match errors of the candidate series. Such a condition could be indicative of a photocopy of a genuine mark. In particular, the computing device deems a high Kurtosis and a high Distribution Ratio to be present in the spectra of a genuine mark. In some embodiments, the computing device uses this power series distribution information in conjunction with the match score as a measure of confidence in the verification of a candidate mark.

Turning to FIG. 17, in an embodiment, a computing device generates an electronic signature for a mark (e.g., as set forth in block 208 of FIG. 2A, block 254 for FIG. 2B, block 414 of FIG. 4A, and block 458 of FIG. 4B) by encoding the signature as a string of bytes, which may be represented as American Standard Code for Information Interchange ("ASCII") characters, rather than as numeric magnitude data. This alternative format allows the computing device to use the signature data directly as an index for looking up the mark in a media storage device. In this embodiment, rather than storing the location and magnitude of each signature metric for the genuine mark, the computing device stores the presence (or absence) of significant signature features and each of the evaluated locations within the genuine mark. For example, in the case of a 2D Data Matrix symbol that does not carry or encode a unique identifier or serial number, the computing device stores the signature data of the mark as a string of characters, each encoding the presence or absence of a feature exceeding the minimum magnitude threshold for each characteristic in a subarea, but not encoding further data about the magnitude or number of features in any one characteristic. In this example, each subarea in the mark 1700 of FIG. 17 has four bits of data, one bit for each of set of metrics, where a '1' indicates that the particular metric has a significant feature at that subarea. For example, 0000 (hexadecimal 0) may mean that none of the four tested characteristics are present to a degree greater than the threshold magnitude in that particular subarea. A value of 1111 (hexadecimal F) would meaning that all four of the tested characteristics are present to a degree greater than the minimum in that particular subarea.

In the example of the mark 1700, the first six subareas are coded as follows. (1) A first subarea 1702 has no artifact for average luminance: it is satisfactorily black. It has no grid bias. It does have a large white void. It has no edge shape artifact: its edges are straight and even. The computing device thus codes it as 0010. (2) A second subarea 1704 has a void and an edge shape artifact. The computing device thus codes it as 0011. (3) A third subarea 1706 is noticeably gray rather than black, but has no other artifacts. The computing device thus codes it as 1000. (4) A fourth subarea 1708 has no artifacts. The computing device thus codes it as 0000. (5) A fifth subarea 1710 has a grid bias but no other artifacts. The computing device thus codes it as 0100. (6) A sixth module 1712 has no artifacts. The computing device thus codes it as 0000. Thus, the first six modules are coded as binary 001000111000000001000000, hexadecimal 238040, decimal 35-128-64, or ASCII #€ @. Using a 2D Data Matrix code as an example, with a typical symbol size of 22×22 subareas, the ASCII string portion containing the unique signature data would be 242 characters in length, assuming the data is packed two modules per character (byte). The computing device stores the signature strings of genuine marks in a database, flat file, text document or any other construct appropriate for storing populations of distinct character strings.

According to an embodiment, the process by which a computing device (e.g., the second computing device 324) tests a candidate mark to determine whether the mark is genuine in an ASCII-implemented embodiment is as follows:

(1) The computing device analyzes the candidate mark and extracts its ASCII string.

(2) The computing device performs a search query via a database program using the ASCII string.

(3) The computing device (under the control of the database program) subjects signatures stored in a media storage device to a test for an exact match of the complete candidate search string. If the computing device does not find an exact string match, the computing device may attempt to locate an approximate match, either by searching for sub-strings or by a "fuzzy match" search on the whole strings.

(4) Where the search returns a match to one reference string of at least a first, minimum confidence match threshold, the computing device deems the genuine mark and candidate mark to be the same. In other words, the computing device identifies the candidate mark to be genuine. If, on the other hand, the search returns no string with a percentage match above a second, lower threshold, the computing device rejects the candidate mark as counterfeit or invalid.

(5) Where the search returns one reference string with a percentage match between the first and second thresholds, the computing device may deem the result to be indeterminate. Where the search returns two or more reference strings with a percentage match above the second threshold, the computing device may deem the result to be indeterminate. Alternatively, the computing device may conduct a further analysis to match the candidate mark's string with one of the other stored reference strings.

(6) When the result is indeterminate, the computing device may indicate (e.g., on a user interface or by transmitting a message to the third computing device 240) indicating that that the result is indeterminate. The computing device may prompt the user to submit another image of the candidate mark for testing. Instead, or in addition, the computing device may employ a retry method for encoding the individual features in the captured image of the candidate mark. The computing device may apply the retry method to any subarea whose signature data in the candidate mark is close to the magnitude minimum threshold for that metric. If the mark being tested uses an error correction mechanism, the retry method may be applied to any subarea or part of the candidate mark that the error correction mechanism indicates as possibly damaged or altered. Instead, or in addition, the computing device may de-emphasize any signature data with a magnitude that is close to that minimum magnitude threshold, for example, by searching with its presence bit asserted (set to 1) and then again with the bit un-asserted (set to 0), or by substituting a "wild-card" character. Alternatively, the computing device may recompute the percentage match query by underweighting or ignoring those bits representing features that are close to the threshold.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the flow charts of FIG. 2A, FIG. 2B, FIG. 2C, FIG. 4A, FIG. 4B, and FIG. 4C can be reordered in ways that will be apparent to those of skill in the art.

Furthermore, the steps of these flowcharts as well as the methods described herein may all be carried out on a single computing device.

What is claimed is:

1. On a computing device, a method for determining whether a mark is genuine, the method comprising:
   receiving a captured image of a candidate mark;
   measuring, using the captured image, a first characteristic of the candidate mark at a plurality of locations within the candidate mark, resulting in a first set of metrics for the first characteristic;
   measuring, using the captured image, a second characteristic of the candidate mark at the plurality of locations, resulting in a second set of metrics for the second characteristic,
   wherein the plurality of locations is associated with a plurality of location identifiers,
   generating, based on the first set of metrics and the second set of metrics, an electronic signature for the candidate mark;
   forming a hash identifier for the candidate mark using a subset of the plurality of location identifiers associated with the first characteristic and from a subset of the plurality of location identifiers associated with the second characteristic;
   determining, based on a comparison of the hash identifier of the candidate mark with a hash identifier of a genuine mark, whether the hash identifier of the candidate mark closely matches the hash identifier of the genuine mark;
   if the hash identifier of the candidate mark is determined to closely match the hash identifier of the genuine mark, then
      retrieving, from a media storage device, an electronic signature of the genuine mark, wherein the electronic signature of the genuine mark contains data regarding an artifact of the genuine mark; and
      determining, based on a comparison of the electronic signature of the candidate mark with the retrieved electronic signature of the genuine mark, whether the candidate mark is genuine;
      if the candidate mark is determined to be genuine, then indicating that the candidate mark is genuine.

2. The method of claim 1, wherein the genuine mark is one of a plurality of genuine marks, each of the plurality of genuine marks having associated therewith a hash identifier, the method further comprising, for each of the plurality of genuine marks:
   determining, based on a comparison of the hash identifier of the candidate mark with the hash identifier of the genuine mark, whether the hash identifier of the candidate mark closely matches the hash identifier of the genuine mark;
   if the hash identifier of the candidate mark is determined to closely match the hash identifier of the genuine mark, then
      retrieving, from the media storage device, an electronic signature of the genuine mark, wherein the electronic signature of the genuine mark contains data regarding an artifact of the genuine mark;
      determining, based a comparison of the electronic signature of the candidate mark with the retrieved electronic signature, whether the candidate mark is genuine;
      if the candidate mark is determined to be genuine, then signaling that the candidate mark is genuine.

3. On a computing device, a method for determining whether a mark is genuine, the method comprising:
   receiving a captured image of a candidate mark;
   measuring, using the captured image, a characteristic of the candidate mark at a plurality of locations within the candidate mark, resulting in a set of metrics for the characteristic,
   wherein the plurality of locations is associated with a plurality of location identifiers;
   generating, based on the set of metrics, an electronic signature for the candidate mark;
   deriving the hash identifier using index values corresponding to the subset of the plurality of locations associated with highest-magnitude metrics of the set of metrics;
   determining, based on a comparison of the hash identifier of the candidate mark with a hash identifier of a genuine mark, whether the hash identifier of the candidate mark closely matches the hash identifier of the genuine mark;
   if the hash identifier of the candidate mark is determined to closely match the hash identifier of the genuine mark, then
      retrieving, from a media storage device, an electronic signature of the genuine mark, wherein the electronic signature of the genuine mark contains data regarding an artifact of the genuine mark;
      determining, based on a comparison of the electronic signature of the candidate mark with the retrieved electronic signature of the genuine mark, whether the candidate mark is genuine;
      if the candidate mark is determined to be genuine, then indicating that the candidate mark is genuine.

4. The method of claim 3, wherein deriving the hash identifier using index values corresponding to highest-magnitude metrics of the set of metrics comprises forming the hash identifier from the index values of subareas of the candidate mark for which the measured characteristic exceeds a predetermined value.

5. On a computing device, a method for determining whether a mark is genuine, the method comprising:
   receiving a captured image of a candidate mark;
   measuring, using the captured image, a characteristic of the candidate mark at a plurality of locations within the candidate mark,
   wherein measuring the characteristic of the candidate mark at a plurality of locations within the candidate mark using the captured image comprises measuring an average pigmentation of a plurality of subareas of the candidate mark, resulting in a set of metrics for the average pigmentation,
   wherein the plurality of subareas is associated with a plurality of location identifiers;
   generating, based on the set of metrics, an electronic signature for the candidate mark;
   deriving a hash identifier for the candidate mark using a subset of the plurality of location identifiers;
   determining, based on a comparison of the hash identifier of the candidate mark with a hash identifier of a genuine mark, whether the hash identifier of the candidate mark closely matches the hash identifier of the genuine mark;
   if the hash identifier of the candidate mark is determined to closely match the hash identifier of the genuine mark, then
      retrieving, from a media storage device, an electronic signature of the genuine mark, wherein the electronic signature of the genuine mark contains data regarding an artifact of the genuine mark;

determining, based on a comparison of the electronic signature of the candidate mark with the retrieved electronic signature of the genuine mark, whether the candidate mark is genuine;

if the candidate mark is determined to be genuine, then indicating that the candidate mark is genuine.

6. On a computing device, a method for determining whether a mark is genuine, the method comprising:

receiving a captured image of a candidate mark;

measuring, using the captured image, a characteristic of the candidate mark at a plurality of locations within the candidate mark, wherein measuring, the characteristic of the candidate mark using the captured image comprises measuring a deviation in a position of a subarea of the candidate mark from a best-fit grid at a plurality of locations of the candidate mark, resulting in a set of metrics for the deviation from the best-fit grid, wherein the plurality of locations is associated with a plurality of location identifiers;

generating, based on the set of metrics, an electronic signature for the candidate mark;

deriving a hash identifier for the candidate mark using a subset of the plurality of location identifiers;

determining, based on a comparison of the hash identifier of the candidate mark with a hash identifier of a genuine mark, whether the hash identifier of the candidate mark closely matches the hash identifier of the genuine mark;

if the hash identifier of the candidate mark is determined to closely match the hash identifier of the genuine mark, then retrieving, from a media storage device, an electronic signature of the genuine mark, wherein the electronic signature of the genuine mark contains data regarding an artifact of the genuine mark;

determining, based on a comparison of the electronic signature of the candidate mark with the retrieved electronic signature of the genuine mark, whether the candidate mark is genuine;

if the candidate mark is determined to be genuine, then indicating that the candidate mark is genuine.

7. On a computing device, a method for determining whether a mark is genuine, the method comprising:

receiving a captured image of a candidate mark;

measuring, using the captured image, a characteristic of the candidate mark at a plurality of locations within the candidate mark, wherein measuring the characteristic of the candidate mark using the captured image comprises measuring linearities of a plurality of subareas of the candidate mark, resulting in a set of metrics for linearities, wherein the plurality of subareas is associated with a plurality of location identifiers;

generating, based on the set of metrics, an electronic signature for the candidate mark;

deriving a hash identifier for the candidate mark using a subset of the plurality of location identifiers;

determining, based on a comparison of the hash identifier of the candidate mark with a hash identifier of a genuine mark, whether the hash identifier of the candidate mark closely matches the hash identifier of the genuine mark;

if the hash identifier of the candidate mark is determined to closely match the hash identifier of the genuine mark, then retrieving, from a media storage device, an electronic signature of the genuine mark, wherein the electronic signature of the genuine mark contains data regarding an artifact of the genuine mark;

determining, based on a comparison of the electronic signature of the candidate mark with the retrieved electronic signature of the genuine mark, whether the candidate mark is genuine;

if the candidate mark is determined to be genuine, then indicating that the candidate mark is genuine.

8. On a computing device, a method for determining whether a mark is genuine, the method comprising:

receiving a captured image of a candidate mark;

measuring, using the captured image, a characteristic of the candidate mark at a plurality of locations within the candidate mark, wherein measuring the characteristic of the candidate mark at a plurality of locations within the candidate mark comprises taking measurements of average gray values of each of a plurality of subareas of the candidate mark, wherein the plurality of subareas is associated with a plurality of location identifiers;

organizing the measurements of the average gray values into a list of pigmentation metrics;

identifying a subset of the list of pigmentation metrics to be part of the electronic signature;

generating an electronic signature for the candidate mark, wherein the subset of the list of pigmentation metrics is part of the electronic signture;

deriving a hash identifier for the candidate mark using a subset of the plurality of location identifiers, wherein deriving the hash identifier comprises forming a block of the hash identifier from location identifiers associated with the highest-magnitude metrics of the list of pigmentation metrics;

determining, based on a comparison of the hash identifier of the candidate mark with a hash identifier of a genuine mark, whether the hash identifier of the candidate mark closely matches the hash identifier of the genuine mark;

if the hash identifier of the candidate mark is determined to closely match the hash identifier of the genuine mark, then retrieving, from a media storage device, an electronic signature of the genuine mark, wherein the electronic signature of the genuine mark contains data regarding an artifact of the genuine mark;

determining, based on a comparison of the electronic signature of the candidate mark with the retrieved electronic signature of the genuine mark, whether the candidate mark is genuine;

if the candidate mark is determined to be genuine, then indicating that the candidate mark is genuine.

9. On a computing device, a method for determining whether a mark is genuine, the method comprising:

receiving a captured image of a candidate mark;

measuring, using the captured image, a characteristic of the candidate mark at a plurality of locations within the candidate mark, resulting in a set of metrics for the characteristic, wherein measuring the characteristic of the candidate mark at a plurality of locations within the candidate mark comprises taking measurements of the deviation from a best-fit grid of each of a plurality of subareas of the candidate mark, wherein the plurality of subareas is associated with a plurality of location identifiers;

organizing the measurements of the deviations into a list of deviation metrics; and identifying a subset of the list of deviation metrics to be part of the electronic signature;

generating, based on the set of metrics, an electronic signature for the candidate mark;

deriving a hash identifier for the candidate mark using a subset of the plurality of location identifiers, wherein deriving the hash identifier comprises forming a block of the hash identifier from location identifiers associated with the highest-magnitude metrics of the list of deviation metrics;

determining, based on a comparison of the hash identifier of the candidate mark with a hash identifier of a genuine mark, whether the hash identifier of the candidate mark closely matches the hash identifier of the genuine mark;

if the hash identifier of the candidate mark is determined to closely match the hash identifier of the genuine mark, then retrieving, from a media storage device, an electronic signature of the genuine mark, wherein the electronic signature of the genuine mark contains data regarding an artifact of the genuine mark;

determining, based on a comparison of the electronic signature of the candidate mark with the retrieved electronic signature of the genuine mark, whether the candidate mark is genuine;

if the candidate mark is determined to be genuine, then indicating that the candidate mark is genuine.

10. On a computing device, a method for determining whether a mark is genuine, the method comprising:

receiving a captured image of a candidate mark;

measuring, using the captured image, a characteristic of the candidate mark at a plurality of locations within the candidate mark, resulting in a set of metrics for the characteristic, wherein measuring the characteristic of the candidate mark at a plurality of locations within the candidate mark comprises taking measurements of non-linearities in each of a plurality of subareas of the candidate mark, wherein the plurality of locations is associated with a plurality of location identifiers;

generating, based on the set of metrics, an electronic signature for the candidate mark;

deriving a hash identifier for the candidate mark using a subset of the plurality of location identifiers, organizing the measurements of the non-linearities into a list of non-linearity metrics;

identifying a subset of the non-linearity metrics to be part of the signature, wherein deriving the hash identifier comprises forming a block of the hash identifier from location identifiers associated with the highest-magnitude metrics of the list of non-linearities metrics;

determining, based on a comparison of the hash identifier of the candidate mark with a hash identifier of a genuine mark, whether the hash identifier of the candidate mark closely matches the hash identifier of the genuine mark;

if the hash identifier of the candidate mark is determined to closely match the hash identifier of the genuine mark, then retrieving, from a media storage device, an electronic signature of the genuine mark, wherein the electronic signature of the genuine mark contains data regarding an artifact of the genuine mark; and determining, based on a comparison of the electronic signature of the candidate mark with the retrieved electronic signature of the genuine mark, whether the candidate mark is genuine; and if the candidate mark is determined to be genuine, then indicating that the candidate mark is genuine.

* * * * *